US012743163B2

(12) United States Patent
Zhang et al.

(10) Patent No.: US 12,743,163 B2
(45) Date of Patent: Sep. 22, 2026

(54) MOUSE STRUCTURE

(71) Applicants: LITE-ON Technology Corporation, Taipei City (TW); Silitek Electronics (Dongguan) Co., Ltd, Dong Guan (CN)

(72) Inventors: Zhi-Yun Zhang, Taipei City (TW); Chi-Feng Chen, Taipei City (TW); HaiJun Chen, Dong Guan (CN)

(73) Assignees: LITE-ON Technology Corporation, Taipei (TW); Silitek Electronics (Dongguan) Co., Ltd, Dong Guan (CN)

( * ) Notice: Subject to any disclaimer, the term of this patent is extended or adjusted under 35 U.S.C. 154(b) by 0 days.

(21) Appl. No.: 19/086,171

(22) Filed: Mar. 21, 2025

(65) Prior Publication Data

US 2026/0277339 A1 Sep. 17, 2026

Related U.S. Application Data

(60) Provisional application No. 63/573,484, filed on Apr. 3, 2024.

(30) Foreign Application Priority Data

Mar. 17, 2025 (CN) ......................... 202520459177.1

(51) Int. Cl.
*G06F 3/0354* (2013.01)

(52) U.S. Cl.
CPC ................................ *G06F 3/03543* (2013.01)

(58) Field of Classification Search
CPC . G06F 3/01; G06F 3/035; G06F 3/033; G06F 3/044
See application file for complete search history.

(56) References Cited

U.S. PATENT DOCUMENTS

2018/0335859 A1* 11/2018 Hsiao ..................... G01G 19/52
2021/0064154 A1* 3/2021 Bustamante .......... H04L 67/125

* cited by examiner

*Primary Examiner* — Michael A Faragalla

(57) ABSTRACT

A mouse device comprises a first module and a second module. The first module includes a first body having a first inclined surface and a bottom surface. The first inclined surface forms a first angle relative to the bottom surface. The second module includes a second body having a second inclined surface, a first surface, and a second surface. The second inclined surface is located between the first and second surfaces and forms a second angle with the first surface. The second inclined surface also forms a third angle with the second surface. When the first angle is adjacent to the second angle, the bottom surface of the mouse and the first surface form a flat bottom in a stowed state. When the first angle is adjacent to the third angle, the bottom surface of the mouse and the second surface form an angled bottom in a usage state.

20 Claims, 23 Drawing Sheets

MOUSE STRUCTURE

CROSS-REFERENCES

This application claims the benefit of priority to U.S. Provisional Patent Application No. 63/573,484, filed on Apr. 3, 2024, and to Chinese Patent Application No. 2025204591771, filed on Mar. 17, 2025, the entire contents of which are incorporated herein by reference.

TECHNICAL FIELD

The present application relates to the technical field of mouse devices, and more particularly to a mouse structure.

DESCRIPTION OF RELATED ART

Most conventional mouse structures have a fixed external form, with a predetermined volume and structural shape. Because the outer design of a mouse must accommodate a user's palm for gripping and control, the structure of a mouse is typically configured with a raised, contoured profile. When the mouse is stored, its fixed shape occupies a certain amount of space, and its structure is not easily stackable with other objects. As such, traditional mouse structures suffer from drawbacks in terms of portability and ease of storage.

SUMMARY OF THE INVENTION

The embodiments of the present application provide a mouse device that can be freely switched between a usage state and a stowed state by assembling a first module and a second module, thereby solving the problem of inconvenient storage and transport in conventional mouse structures.

A mouse device comprising a first module and a second module. The first module includes a first body, the first body having a first inclined surface and a bottom surface of the mouse. The first inclined surface forms a first angle with respect to the bottom surface. The second module includes a second body, the second body having a second inclined surface, a first surface, and a second surface. The second inclined surface is disposed between the first and second surfaces and forms a second angle relative to the first surface. The first angle is not equal to the second angle. The second inclined surface also forms a third angle relative to the second surface, and the first angle is equal to the third angle. The first and second inclined surfaces are assembled in contact with each other. When the first angle is adjacent to the second angle, the bottom surface and the first surface form a flat bottom surface. When the first angle is adjacent to the third angle, the bottom surface and the second surface form an angled bottom surface.

In one embodiment, the first inclined surface includes a first assembly structure, and the second inclined surface includes a second assembly structure, the first and second assembly structures being configured to interlock.

In one embodiment, the first assembly structure includes a protrusion and the second assembly structure includes a groove, the protrusion being configured to be fitted into the groove.

In one embodiment, a sidewall of the protrusion adjacent to the bottom surface of the mouse includes a first locking portion, and an inner wall of the groove adjacent to the second surface includes a second locking portion. When the first and second locking portions are engaged, the bottom surface and the second surface form the angled bottom surface.

In one embodiment, the first locking portion is a limiting protrusion and the second locking portion is a recess, the limiting protrusion being configured to snap into the recess.

In one embodiment, a side of the protrusion adjacent to the first locking portion includes a hollow portion, and the first locking portion is deformable with respect to the hollow portion.

In one embodiment, the first assembly structure includes a first magnetic element and the second assembly structure includes a second magnetic element, the first and second magnetic elements being magnetically attracted to each other.

In one embodiment, the first magnetic element is a magnet, and the second magnetic element is a magnet or a magnetic material.

In one embodiment, the protrusion includes a recess on a sidewall adjacent to the bottom surface of the mouse, and the groove includes a hook member on an inner wall adjacent to the second surface. The recess and the hook member are configured to interlock, such that the bottom surface and the second surface form the angled bottom surface.

In one embodiment, the second body has an outer surface defined as a second housing. The hook member includes an opening and a hook assembly, wherein the opening is located on the inner wall of the groove adjacent to the second surface, and the hook assembly is disposed inside the second body. The second surface of the second housing includes a through-hole. The hook assembly further includes a linkage member and a hook piece, one end of the linkage member being positioned within the through-hole, and the other end being operatively connected to the hook piece, one end of which is positioned within the opening.

In one embodiment, the hook piece includes a body portion and a hook portion, the hook portion extending outward from the body portion to the opening. The hook assembly further includes a fixing member and an elastic member. The elastic member is disposed between the body portion and the second housing. The fixing member is disposed around the linkage member. The other end of the linkage member passes through the fixing member and the body portion of the hook piece, and presses against the body portion.

In one embodiment, the other end of the linkage member includes a pressing portion, which has a first pressing edge. The body portion includes a second pressing edge. The first pressing edge is configured to abut against the second pressing edge. When the linkage member moves toward the hook portion, it presses the body portion, compresses the elastic member, and retracts the hook portion into the opening. When the linkage member moves away from the hook portion, it no longer presses the body portion, and the elastic member elastically supports the body portion, causing the hook portion to protrude from the opening.

In one embodiment, the first inclined surface includes a first electrical structure, and the second inclined surface includes a second electrical structure, the first and second electrical structures being electrically connectable.

In one embodiment, the first module includes a control unit and a circuit board. The control unit is disposed on the surface of the first body opposite to the bottom surface. The circuit board is disposed inside the first body. The control unit is electrically connected to the circuit board, and the circuit board is electrically connected to the first electrical structure. The second module includes a power unit disposed within the second body, and the power unit is electrically connected to the second electrical structure.

In one embodiment, when the bottom surface and the second surface form the angled bottom surface, the first electrical structure includes an electrical plug and the second electrical structure includes an electrical socket. The electrical plug is configured to be inserted into the socket.

In one embodiment, when the bottom surface and the first surface form the flat bottom surface, the first electrical structure includes an electrical plug and the second electrical structure includes a storage socket. The electrical plug is configured to be stored within the socket.

In one embodiment, the first module includes a control unit, a circuit board, and a power unit. The control unit is disposed on the surface of the first body opposite to the bottom surface. The circuit board and the power unit are disposed within the first body. The control unit is electrically connected to the circuit board, and the circuit board is electrically connected to the power unit.

In one embodiment, the control unit includes a touchpad or a combination of buttons and a scroll wheel.

In one embodiment, the first module and/or the second module includes a weight block disposed within the first and/or second body.

In one embodiment, the first angle and the second angle are complementary angles, the first angle is equal to the third angle, and the third angle and the second angle are also complementary.

The present application provides a mouse structure that enables flexible switching between a usage state and a stowed state by assembling a first module with a second module. The inclined surface of the first module is configured to mate with the inclined surface of the second module, such that the two surfaces are assembled in direct contact. When the two modules are assembled in a flat configuration, the mouse is in a stowed state. When the two modules are assembled in a bent or angled configuration, the mouse is in a usage state. This structural arrangement allows the user to conveniently store the device when not in use.

These and other aspects, features, and advantages of the present invention will become more apparent from the following detailed description and the accompanying drawings. The foregoing summary is not intended to limit the scope of the invention, which is defined solely by the appended claims, but to provide a brief overview to aid understanding of the invention and its various embodiments.

BRIEF DESCRIPTION OF DRAWINGS

The accompanying drawings are provided to further illustrate the embodiments of the present application and form a part of this application. The exemplary embodiments and descriptions thereof are intended to explain, but not to unduly limit, the scope of the present application. In the drawings.

DESCRIPTION OF THE INVENTION

Figure 1:
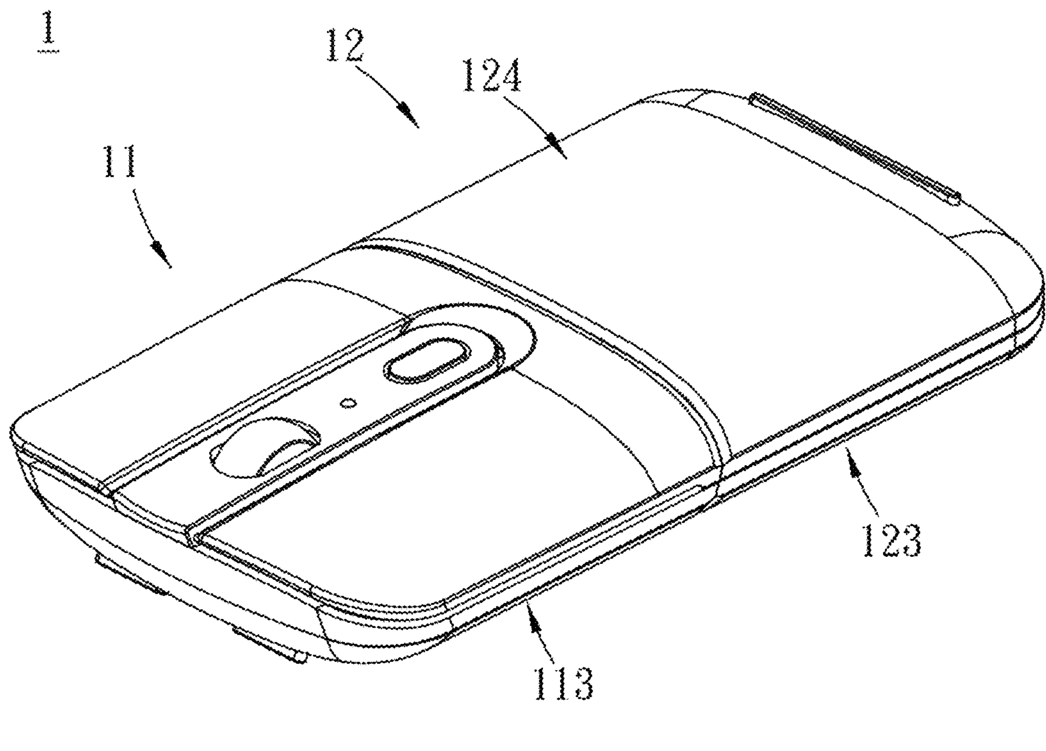
FIG. 1 is a perspective view of the mouse device in the stowed state according to one embodiment of the present application.

The various embodiments of the present application will now be described with reference to the accompanying drawings. For the purpose of clear explanation, many implementation details are described herein together. However, it should be understood that these implementation details are not intended to limit the scope of the invention. In some embodiments of the present application, such implementation details may be optional. For the sake of simplicity, certain well-known structures and components may be illustrated in the drawings using simplified schematic representations. Throughout the embodiments, the same reference numerals are used to denote identical or similar components.

Figure 2:
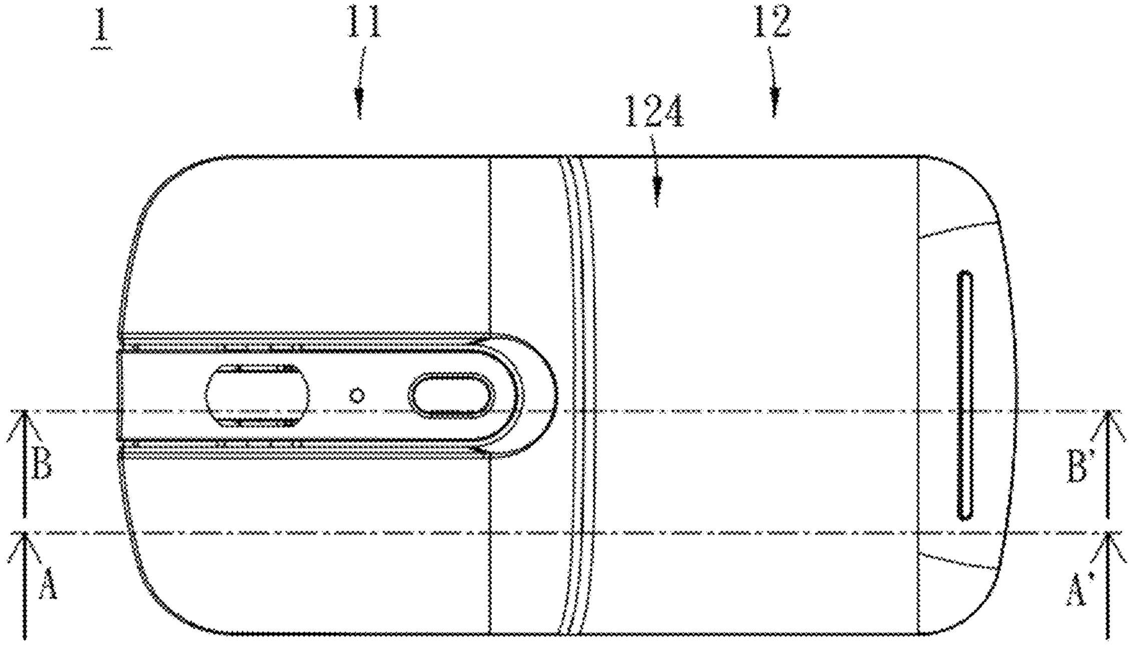
FIG. 2 is a top view of the mouse device in the stowed state.
Figure 3:
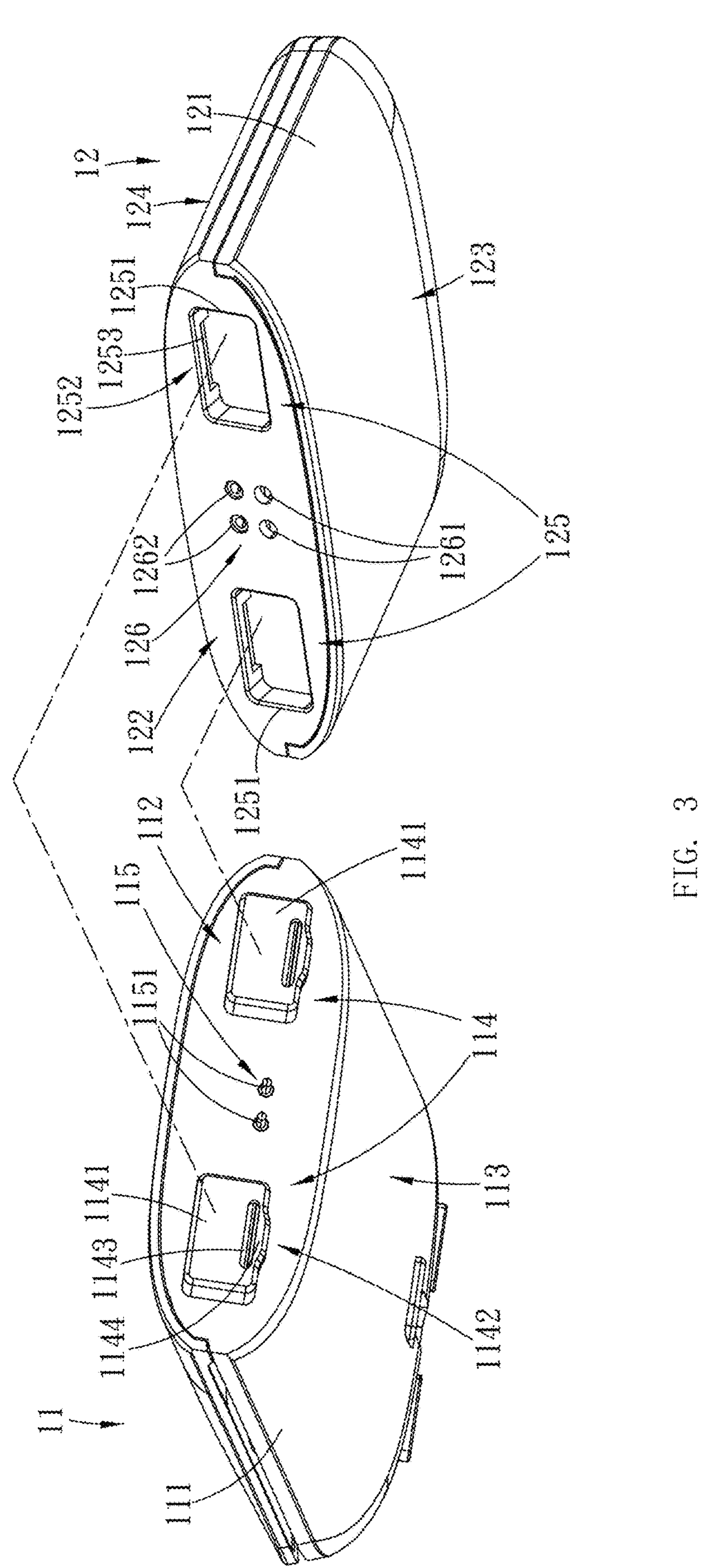
FIG. 3 is an exploded perspective view of the mouse device.
Figure 10:
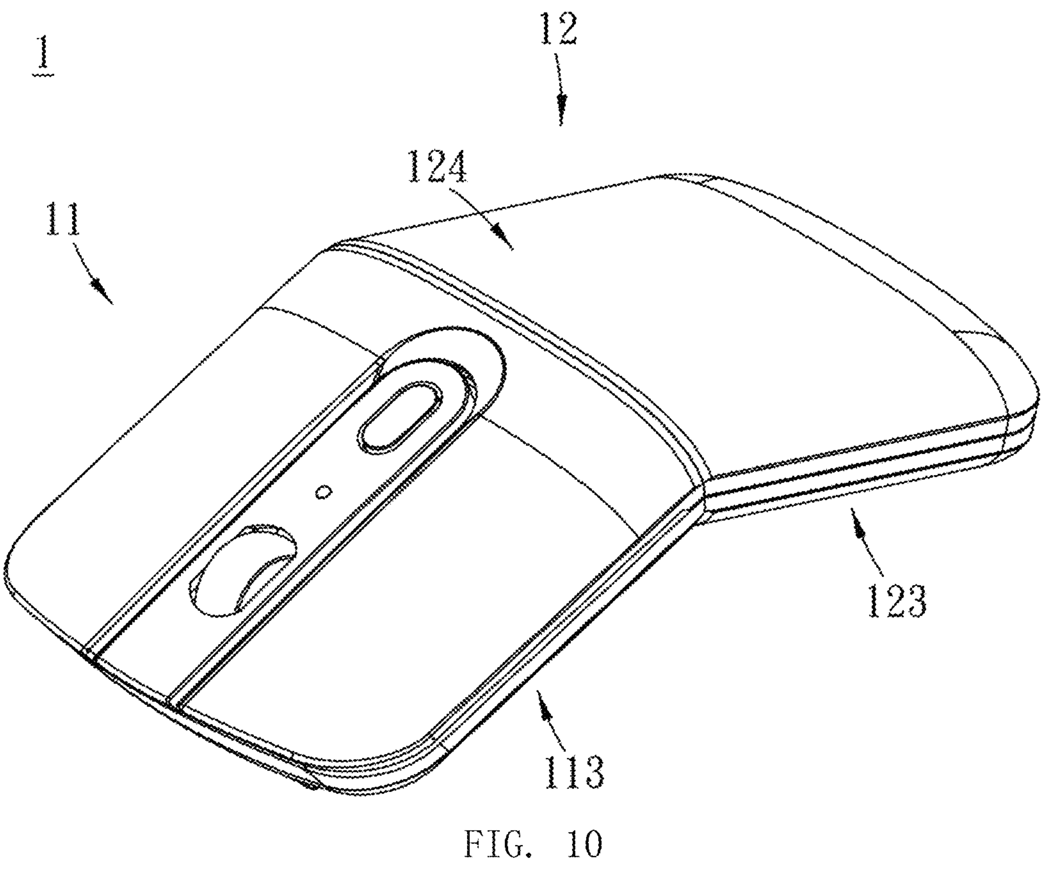
FIG. 10 is a perspective view of the mouse device in the usage state.

Referring to FIGS. 1 to 6. FIG. 1 is a perspective view of the mouse structure of the present application, FIG. 2 is a top view, and FIG. 3 is an exploded view. As shown in the figures, the present application provides a mouse structure 1, which includes a first module 11 and a second module 12. The first module 11 includes a first body 111. The first body 111 has a first inclined surface 112 and a bottom surface 113 of the mouse. The first inclined surface 112 defines a first angle A1 relative to the bottom surface 113. The second module 12 includes a second body 121. The second body 121 has a second inclined surface 122, a first surface 123, and a second surface 124. The second inclined surface 122 is located between the first surface 123 and the second surface 124. The second inclined surface 122 defines a second angle A2 relative to the first surface 123. In this embodiment, the first angle A1 is not equal to the second angle A2. Specifically, the first angle A1 is greater than the second angle A2. In addition, the second inclined surface 122 also defines a third angle A3 relative to the second surface 124. The first angle A1 is equal to the third angle A3. The first inclined surface 112 and the second inclined surface 122 are configured to be joined in contact. When the first angle A1 is adjacent to the second angle A2, the bottom surface 113 and the first surface 123 together form a flat bottom surface, placing the mouse in a flat, stowed configuration (as shown in FIG. 1). Alternatively, when the first angle A1 is adjacent to the third angle A3, the bottom surface 113 and the second surface 124 together form an angled bottom surface, placing the mouse in a three-dimensional, usage configuration (as shown in FIG. 10). Furthermore, there is a geometric relationship among the first angle A1, the second angle A2, and the third angle A3: the first angle A1 and the second angle A2 are complementary; the first angle A1 is equal to the third angle A3; the third angle A3 and the second angle A2 are also complementary.

In this embodiment, the first inclined surface 112 includes a first assembly structure 114, and the second inclined surface 122 includes a second assembly structure 125. The first assembly structure 114 is configured to mate with the second assembly structure 125. Specifically, the first assembly structure 114 includes a protrusion 1141, and the second assembly structure 125 includes a groove 1251. The protrusion 1141 is configured to be inserted into and fitted with the groove 1251. Furthermore, a sidewall of the protrusion 1141 adjacent to the bottom surface 113 of the mouse includes a first locking portion 1142, and an inner wall of the groove 1251 adjacent to the second surface 124 includes a second locking portion 1252. When the protrusion 1141, having the first locking portion 1142, is inserted into the groove 1251 such that the first locking portion 1142 is positioned opposite to the second locking portion 1252, the sidewall of the groove 1251 tightly engages with the first locking portion 1142. As a result, the bottom surface 113 of the first body 111 and the first surface 123 of the second body 121 together form a flat bottom surface, and the mouse structure 1 is thus placed in the stowed configuration.

As described above, one side of the protrusion 1141, adjacent to the first locking portion 1142, is provided with a hollow section 1143. The first locking portion 1142 is deformable relative to the hollow section 1143, meaning that the hollow section 1143 provides a space that allows deformation and compression of the first locking portion 1142. In this embodiment, the first locking portion 1142 is implemented as a limiting protrusion 1144, and the second locking portion 1252 is a fixing recess 1253. The limiting protrusion 1144 of the protrusion 1141 is inserted into the groove 1251 from the side opposite the fixing recess 1253. Upon insertion, the limiting protrusion 1144 is compressed by the inner wall of the groove 1251 and deforms into the hollow section 1143. This configuration allows the protrusion 1141 and the groove 1251 to be tightly fixed to one another by press-fit engagement.

Figure 7:
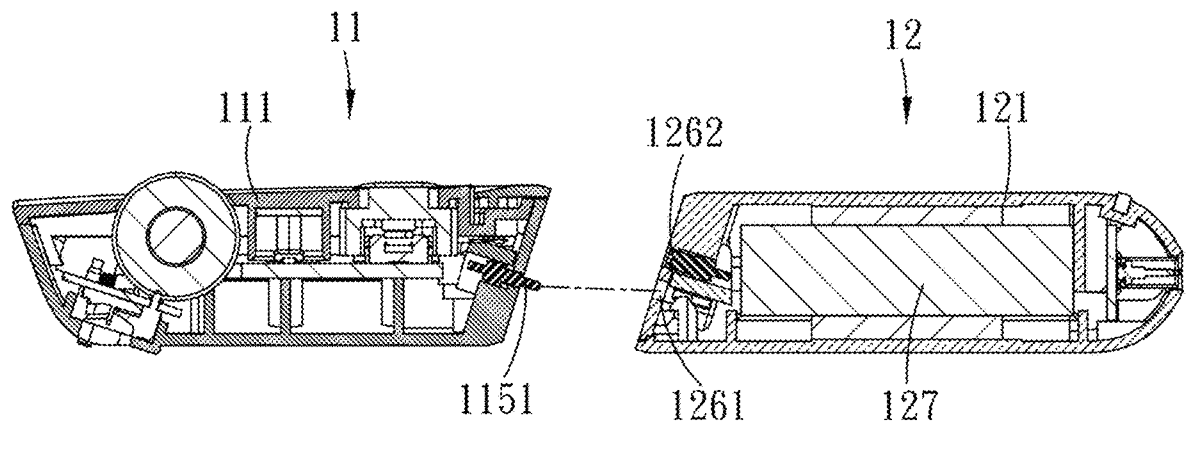
FIG. 7 is a sectional exploded view along line B-B' of FIG. 2.
Figure 8:
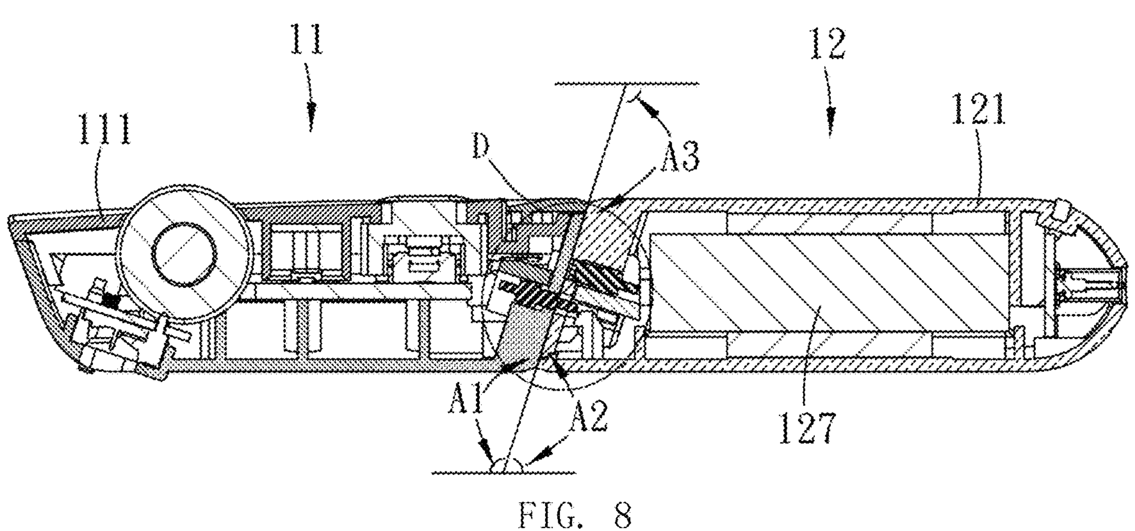
FIG. 8 is a sectional view along line B-B' of FIG. 2.
Figure 9:
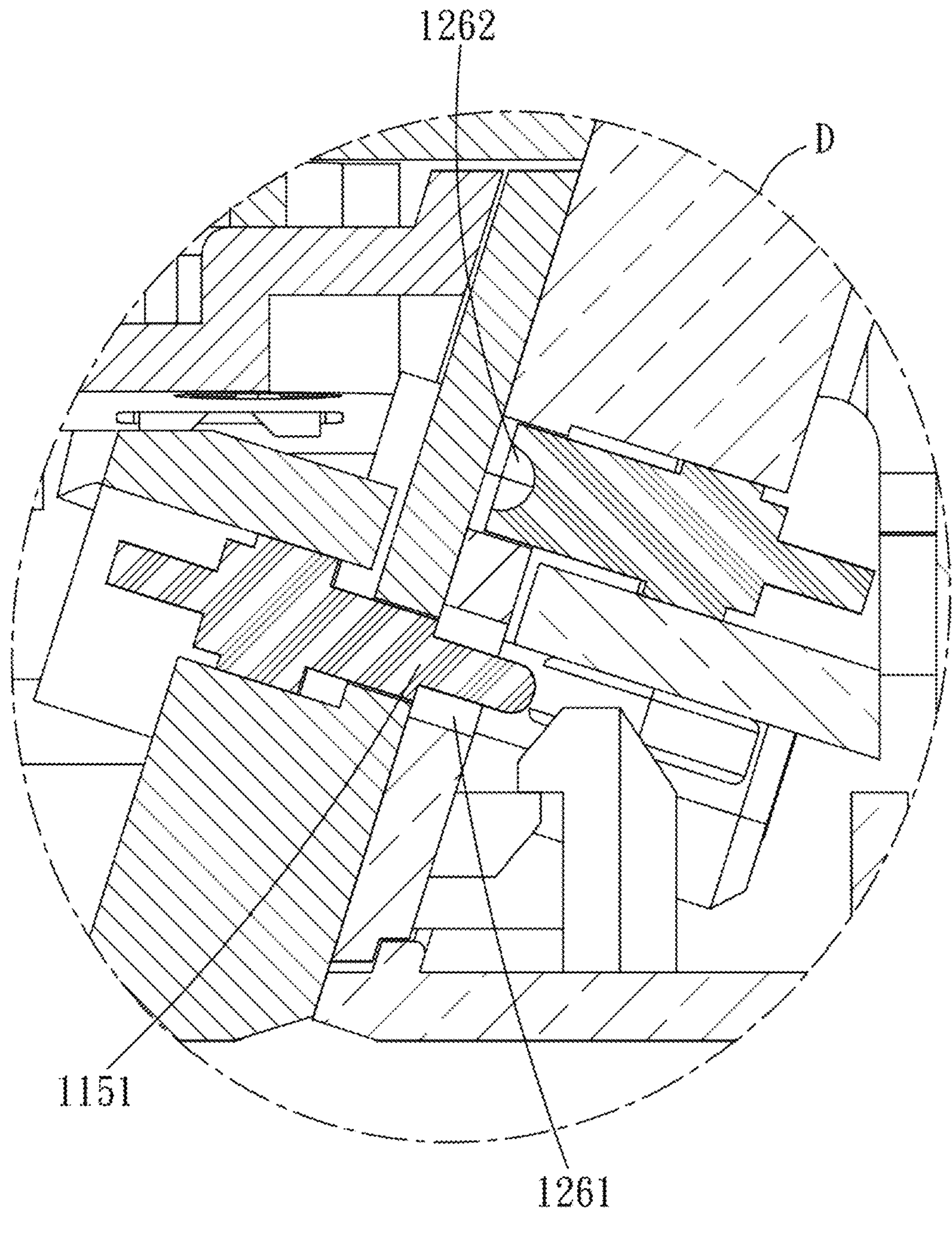
FIG. 9 is an enlarged view of region D in FIG. 8.

Referring also to FIGS. 7 to 9. FIG. 7 is an exploded sectional view along line B-B' of FIG. 2, FIG. 8 is a sectional view along line B-B' of FIG. 2, and FIG. 9 is an enlarged view of region D in FIG. 8. As shown in the figures, in this embodiment, the first inclined surface 112 includes a first electrical structure 115, and the second inclined surface 122 includes a second electrical structure 126. The first electrical structure 115 is configured to be electrically connectable to the second electrical structure 126. Specifically, the first electrical structure 115 includes an electrical plug 1151, and the second electrical structure 126 includes a storage socket 1261. The electrical plug 1151 is inserted and stored in the storage socket 1261 (as shown in FIG. 9). In this configuration, the bottom surface 113 of the first body 111 and the first surface 123 of the second body 121 form a flat bottom surface, corresponding to the stowed state of the mouse device.

Figure 11:
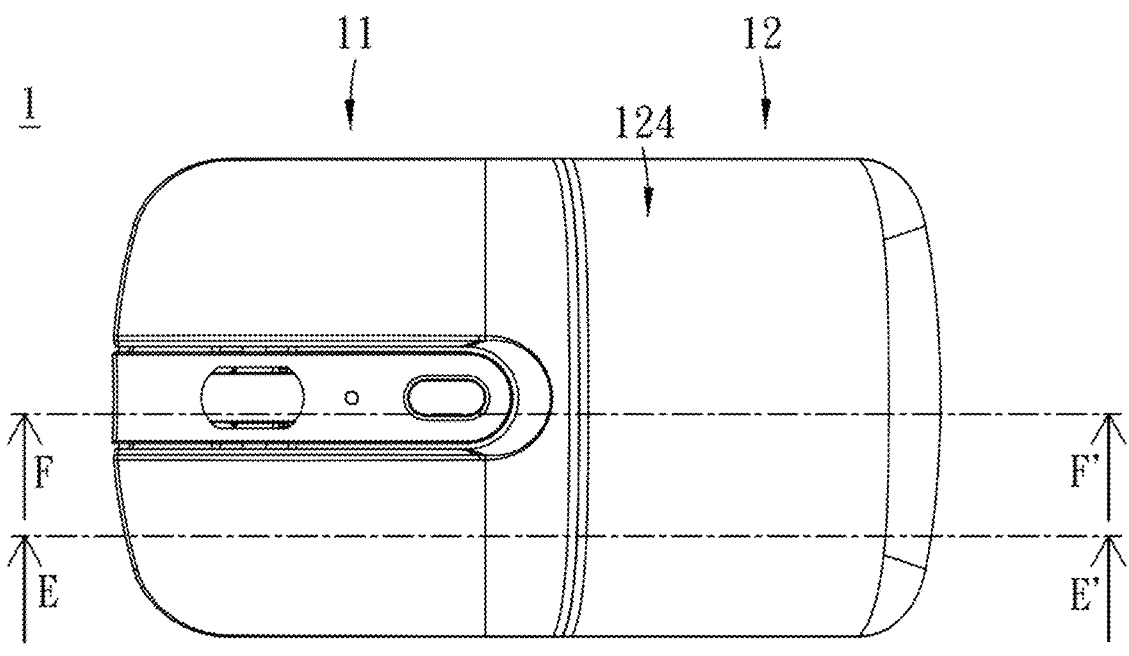
FIG. 11 is a top view of the mouse device in the usage state.
Figure 12:
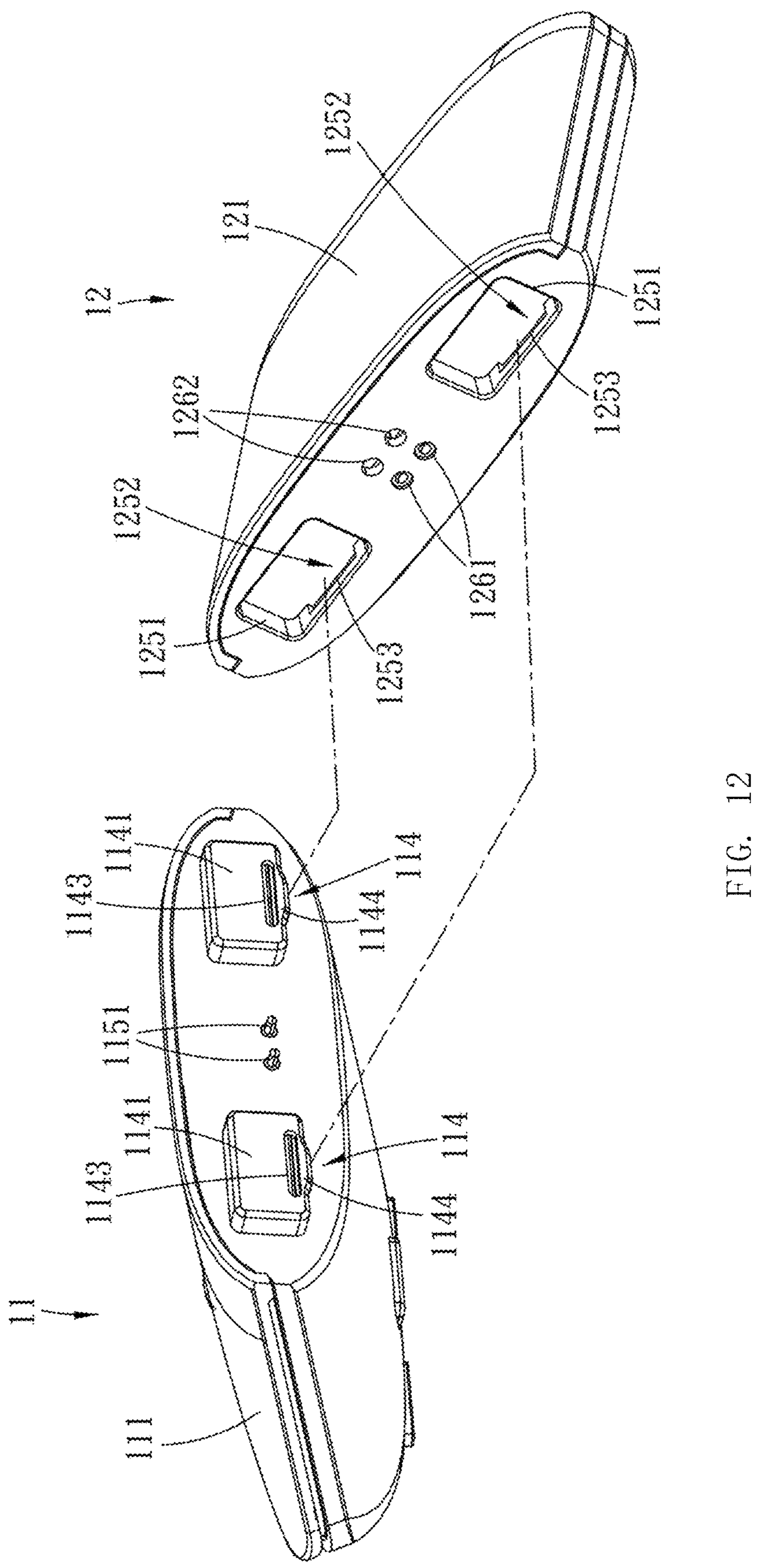
FIG. 12 is an exploded perspective view of the mouse device in the usage state.
Figure 13:
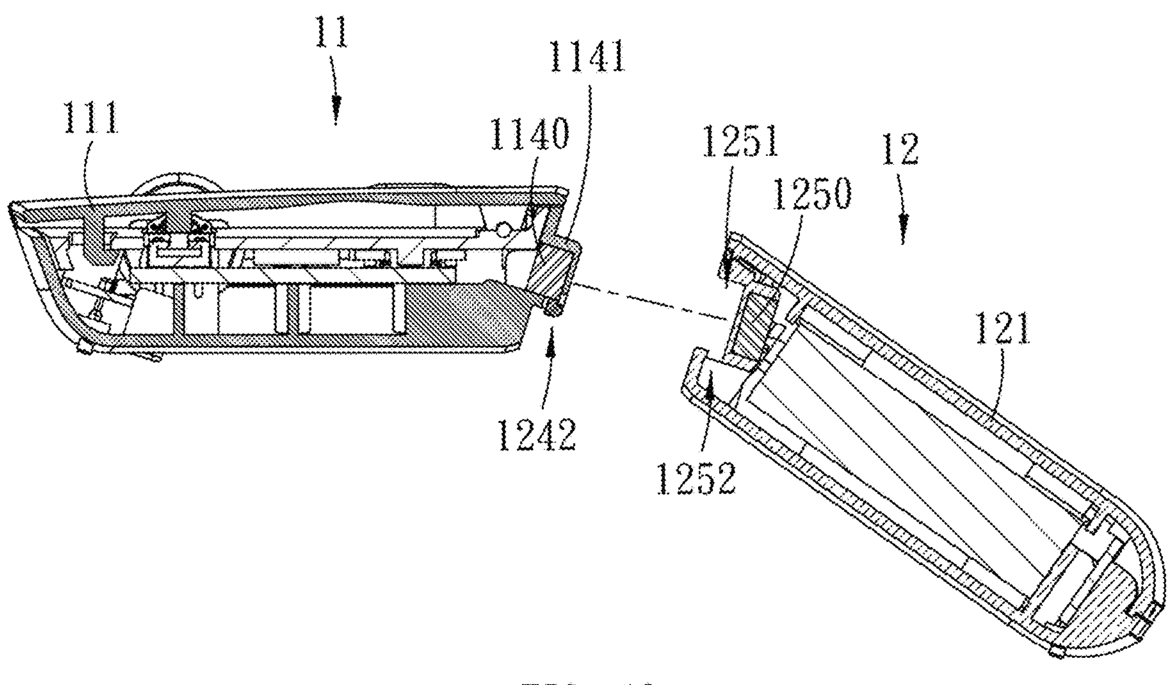
FIG. 13 is a sectional exploded view along line E-E' of FIG. 11.
Figure 14:
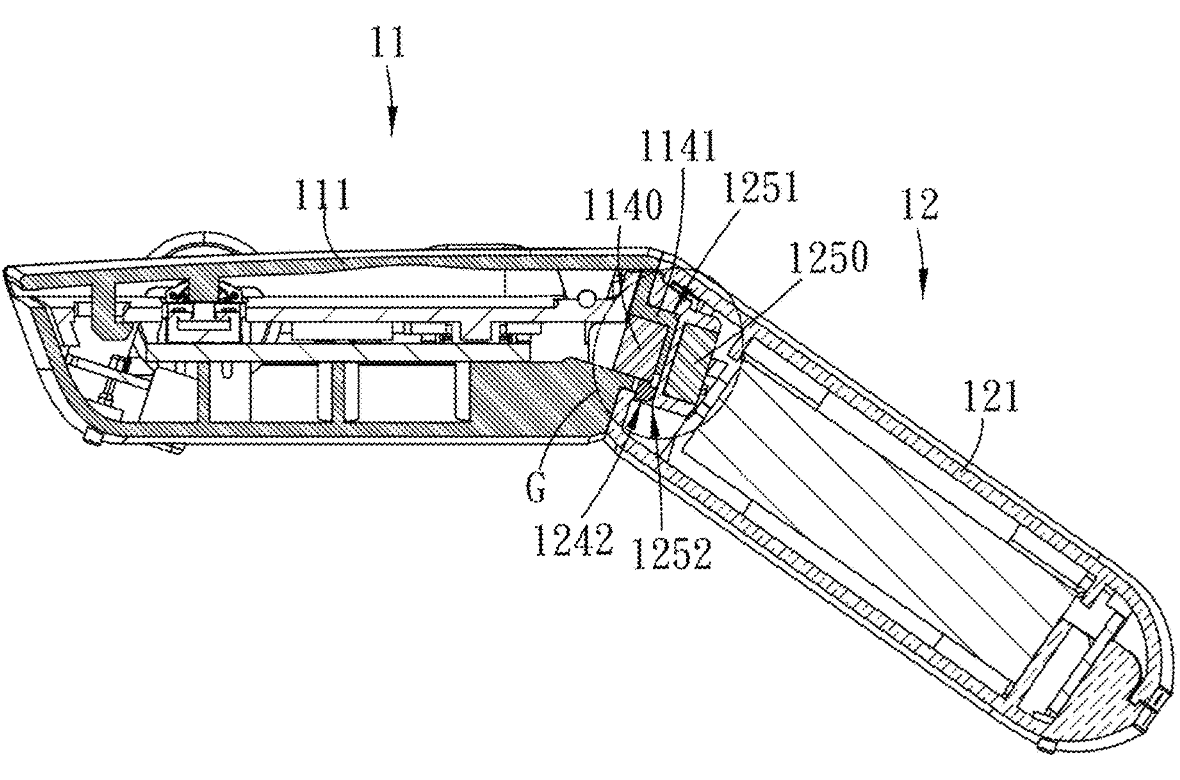
FIG. 14 is a sectional view along line E-E' of FIG. 11.
Figure 15:
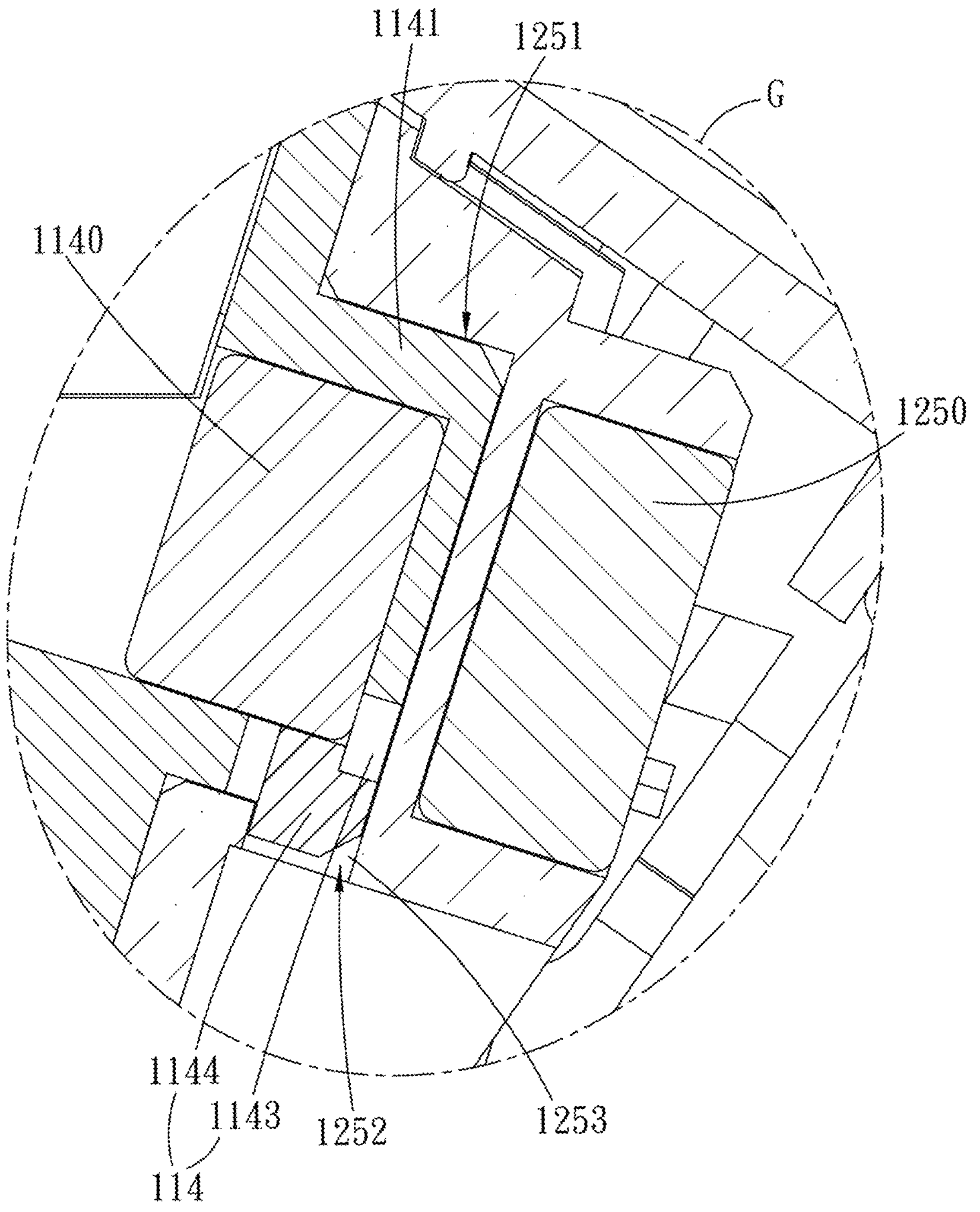
FIG. 15 is an enlarged view of region G in FIG. 14.

Referring to FIGS. 10 to 15. FIG. 10 is a perspective view of the mouse structure in the usage state; FIG. 11 is a top view in the usage state; FIG. 12 is an exploded view of the mouse structure; FIG. 13 is an exploded sectional view along line E-E' of FIG. 11; FIG. 14 is a sectional view along line E-E' of FIG. 11; and FIG. 15 is an enlarged view of region G in FIG. 14. As shown in the figures, in this embodiment, the protrusion 1141 of the first module 11 is disengaged from the groove 1251 of the second module 12. To pull out the first module 11, an external force is required that exceeds the frictional force between the first locking portion 1142 of the protrusion 1141 and the inner wall of the groove 1251. The second module 12 is then flipped, causing the positions of the first surface 123 and the second surface 124 to be interchanged. As a result, the second surface 124 of the second body 121 is aligned with the bottom surface 113 of the first body 111—i.e., the second surface 124 and the bottom surface 113 are located on the same side.

As described above, the protrusion 1141 of the first module 11 is re-inserted into the groove 1251 of the second module 12. The side of the protrusion 1141 having the first locking portion 1142 is moved into engagement with the side of the groove 1251 that includes the second locking portion 1252. Once engaged, the first locking portion 1142 and the second locking portion 1252 lock together. As a result, the bottom surface 113 of the first body 111 and the second surface 124 of the second body 121 form an angled bottom surface, corresponding to the usage state of the mouse. In this embodiment, the limiting protrusion 1144 of the protrusion 1141 is compressed by the inner wall of the groove 1251 and deforms into the hollow section 1143. The limiting protrusion 1144 is then guided along the inner wall of the groove 1251 into a fixing recess 1253. The limiting protrusion 1144 is snap-fitted into the fixing recess 1253. When the mouse structure 1 is held such that the user grips the control surface of the first body 111 (i.e., the surface opposite the bottom surface 113) and the first surface 123 of the second body 121, and a downward force is applied, the limiting protrusion 1144 presses into the fixing recess 1253 of the second body 121. This configuration creates a mutual locking state between the first body 111 and the second body 121, maintaining a stable assembled relationship between the two modules.

Referring again to FIG. 6, the first assembly structure 114 includes a first magnetic element 1140, and the second assembly structure 125 includes a second magnetic element 1250. The first magnetic element 1140 and the second magnetic element 1250 are magnetically attracted to each other, thereby providing a securing force between the two modules. The first magnetic element 1140 may be a magnet, and the second magnetic element 1250 may be either a magnet or a magnetic material. The magnetic attraction between the two components ensures stable engagement. In this embodiment, the magnetic structure can also be used in combination with the protrusion 1141 and the groove 1251.

The first magnetic element 1140 is disposed within the protrusion 1141, and the second magnetic element 1250 is disposed at the bottom of the groove 1251. When the protrusion 1141 is inserted into the groove 1251, the first magnetic element 1140 and the second magnetic element 1250 attract each other, thereby enhancing the overall connection strength between the first body 111 and the second body 121.

Figure 16:
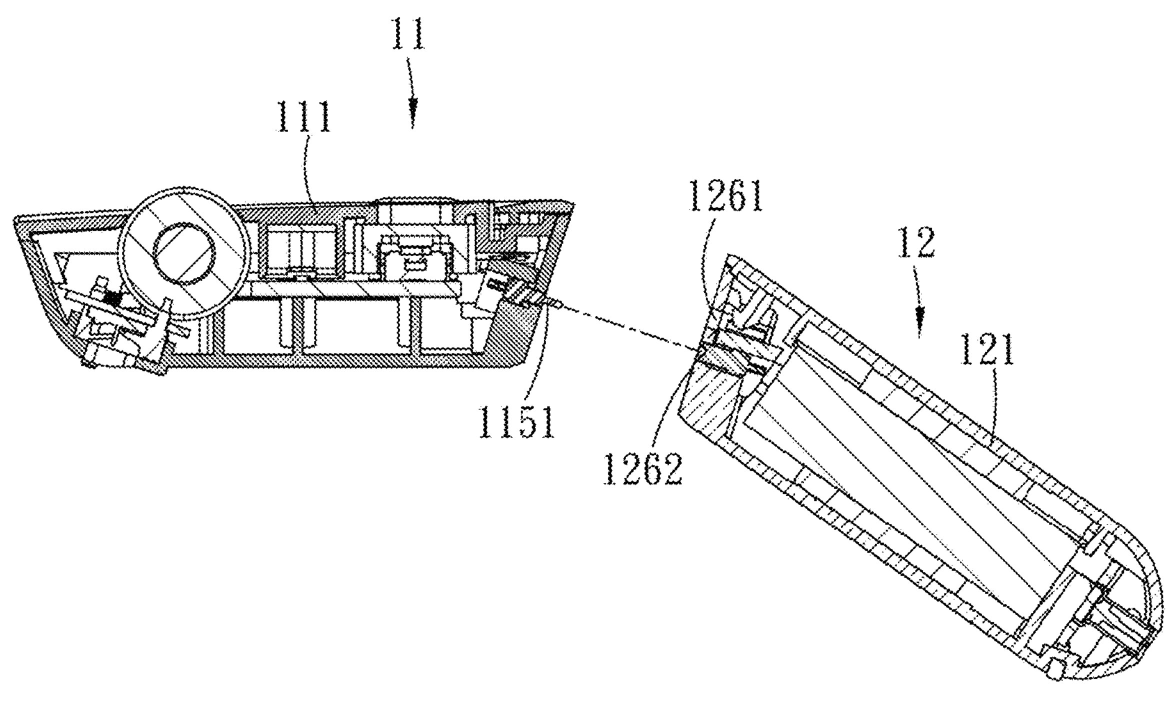
FIG. 16 is a sectional exploded view along line F-F' of FIG. 11.
Figure 17:
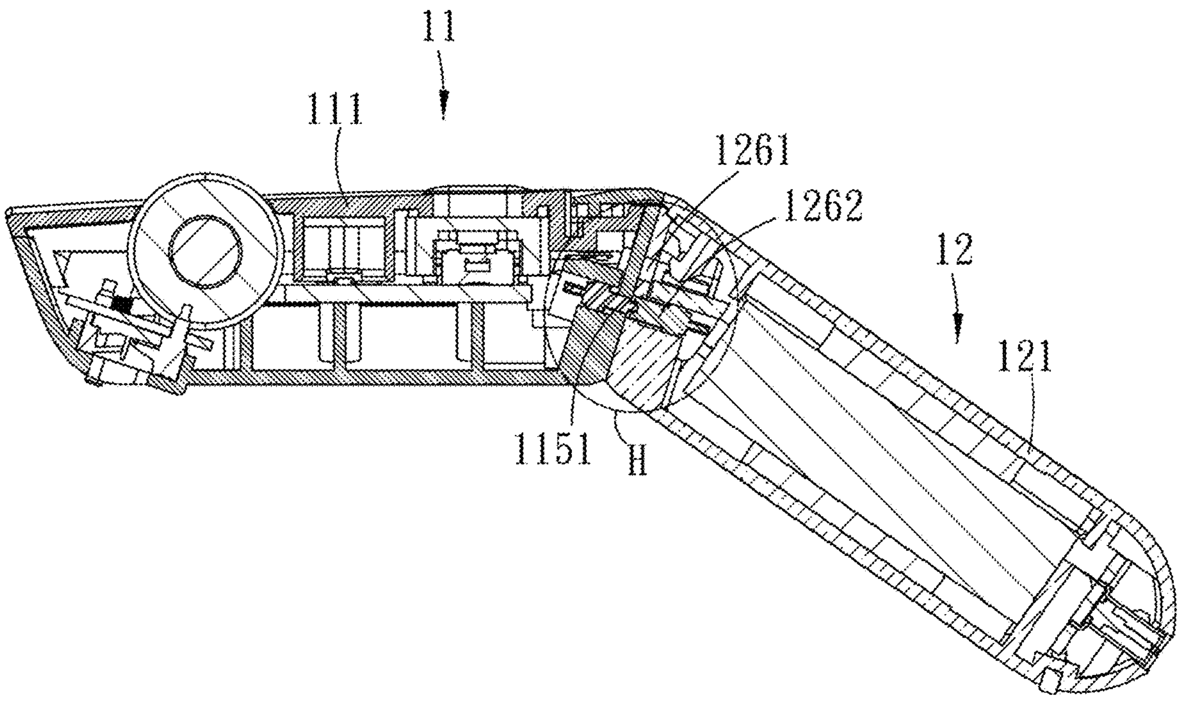
FIG. 17 is a sectional view along line F-F' of FIG. 11.
Figure 18:
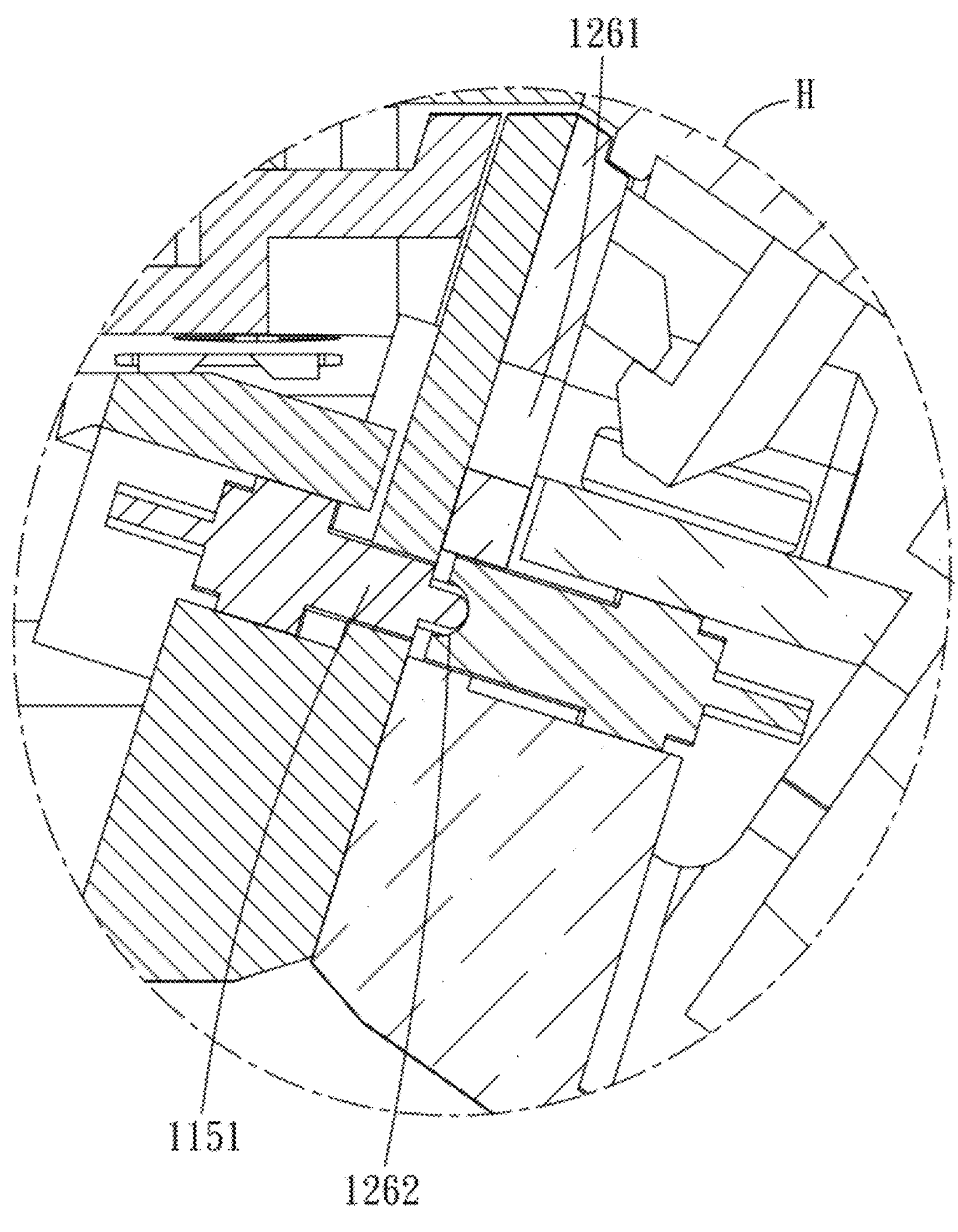
FIG. 18 is an enlarged view of region H in FIG. 17.

Referring also to FIGS. 16 to 18. FIG. 16 is an exploded sectional view along line F-F' of FIG. 11, FIG. 17 is a sectional view along line F-F' of FIG. 11, and FIG. 18 is an enlarged view of region H in FIG. 17. As shown in the figures, in this embodiment, the first electrical structure 115 includes an electrical plug 1151, and the second electrical structure 126 includes an electrical socket 1262. The electrical plug 1151 is electrically connected to the electrical socket 1262 (as shown in FIG. 18). In this configuration, the bottom surface 113 of the first body 111 and the second surface 124 of the second body 121 together form an angled bottom surface, corresponding to the usage state of the mouse device.

Figure 4:
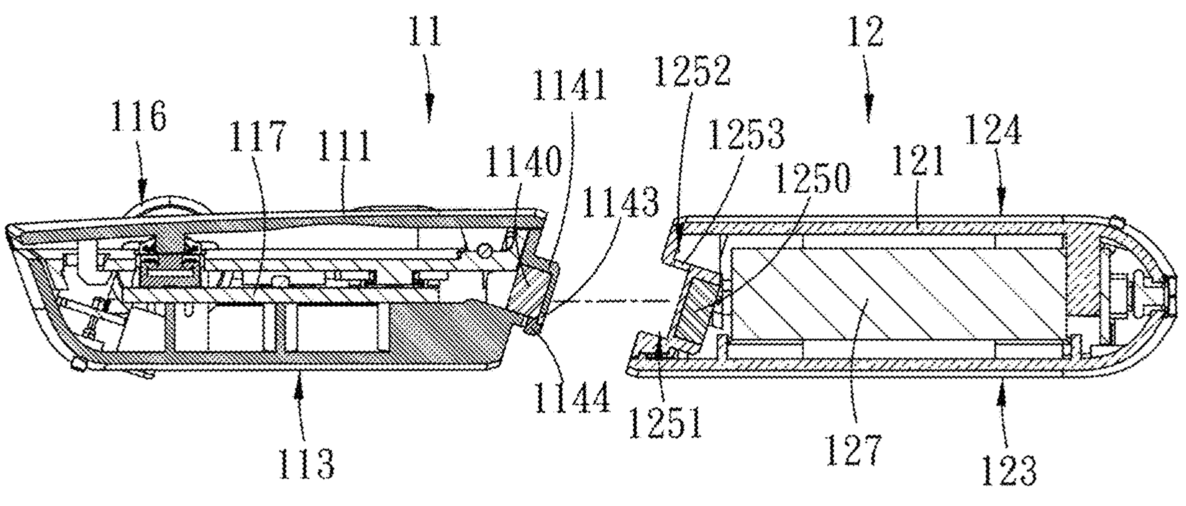
FIG. 4 is a sectional exploded view along line A-A' of FIG. 2.
Figure 5:
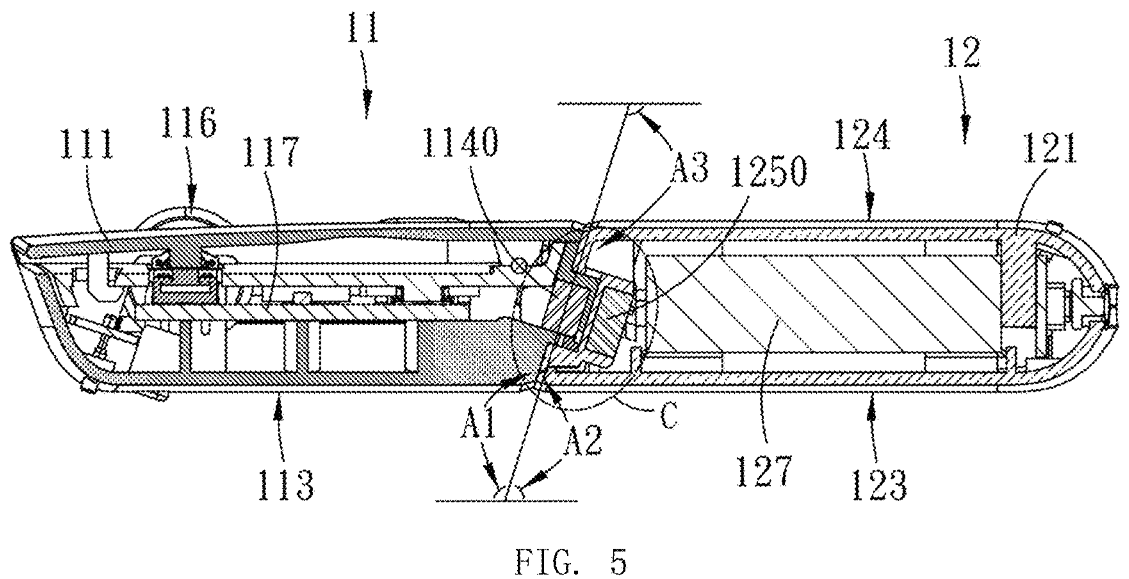
FIG. 5 is a sectional view along line A-A' of FIG. 2.
Figure 6:
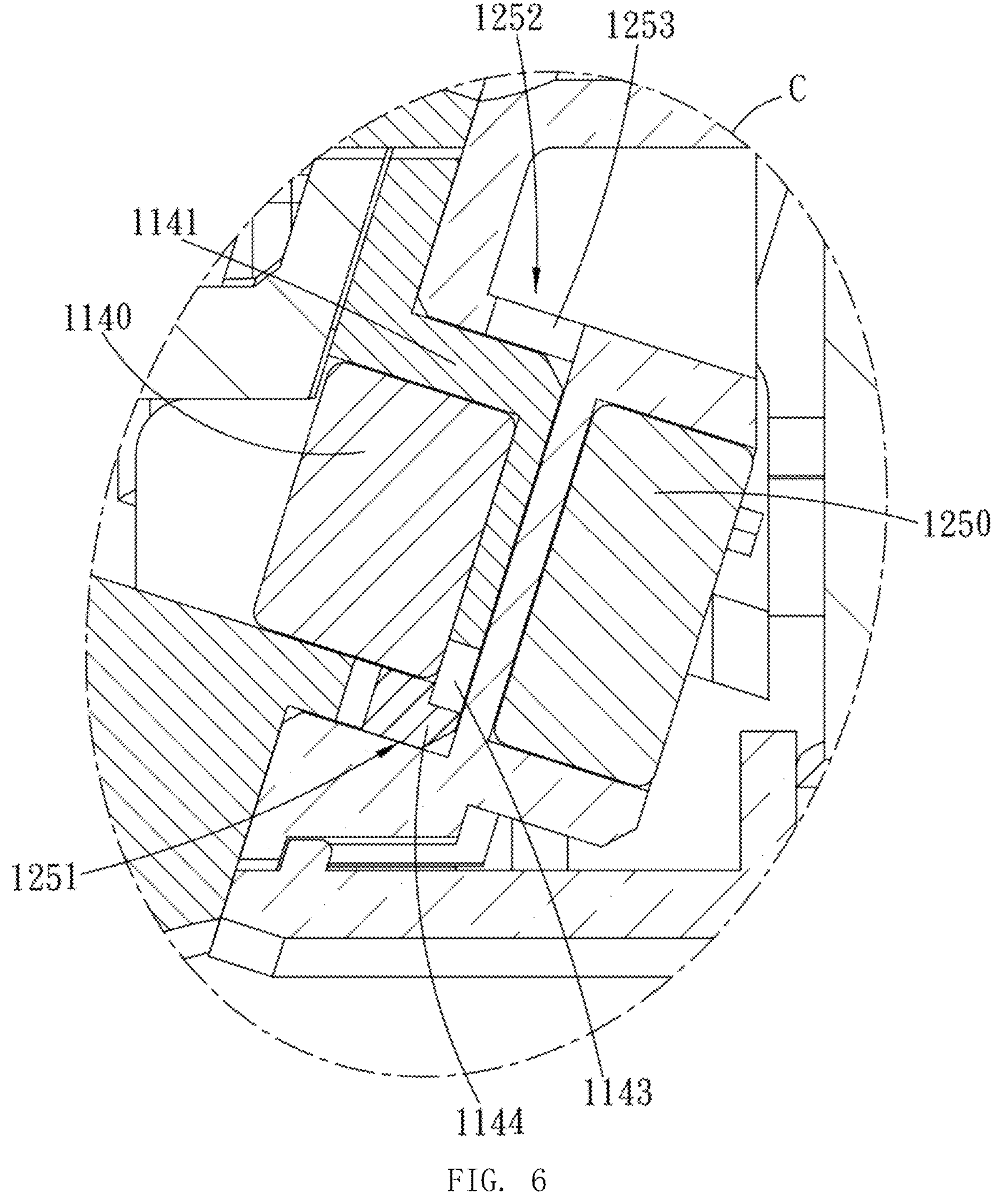
FIG. 6 is an enlarged view of region C in FIG. 5.

As further illustrated in FIGS. 4 and 5, in this embodiment, the first module 11 includes a control unit 116 and a circuit board 117. The control unit 116 is disposed on the surface of the first body 111 opposite to the bottom surface 113. The circuit board 117 is disposed within the interior of the first body 111. The control unit 116 is electrically connected to the circuit board 117, and the circuit board 117 is electrically connected to the first electrical structure 115. The second module 12 includes a power unit 127, which is disposed inside the second body 121. The power unit 127 is electrically connected to the second electrical structure 126. In this arrangement, the control-related components—namely the control unit 116 and the circuit board 117—are all located within the first body 111, while the power source, i.e., the power unit 127, is located within the second body 121. Furthermore, the first electrical structure 115 and the second electrical structure 126 are electrically connected to each other, such that the electrical plug 1151 of the first body 111 is inserted into the electrical socket 1262 of the second body 121. In this manner, power is supplied from the power unit 127 to both the circuit board 117 and the control unit 116. The control unit 116 may be implemented as a touchpad (as shown in FIGS. 19 and 20), or as a combination of buttons and a scroll wheel (as shown in FIGS. 1 and 2), depending on the user's design requirements.

Figure 25:
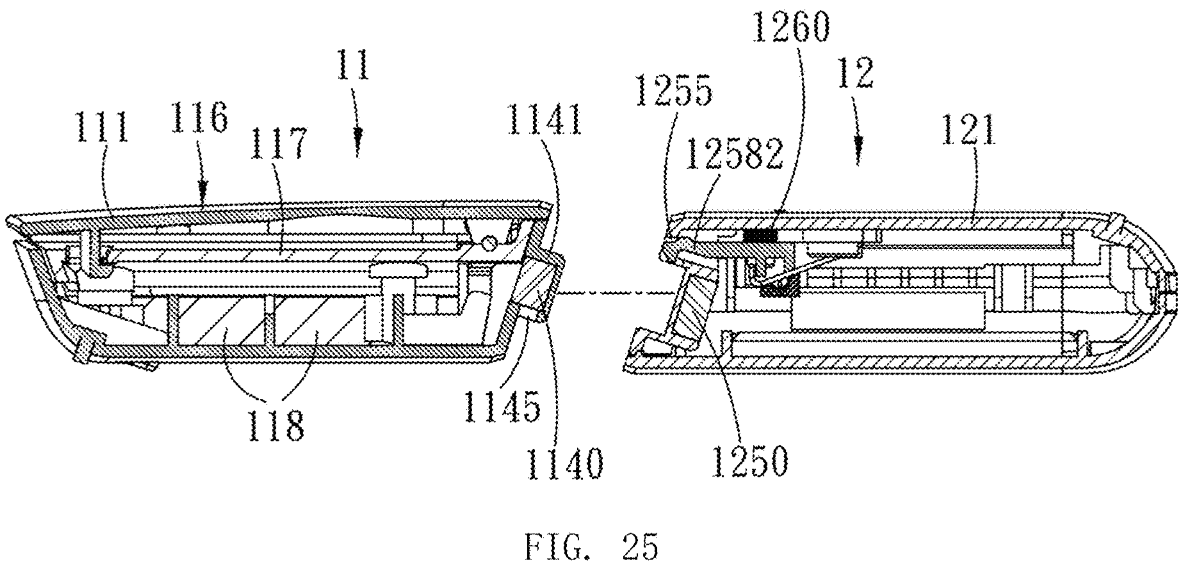
FIG. 25 is a sectional exploded view along line I-I' of FIG. 20.
Figure 26:
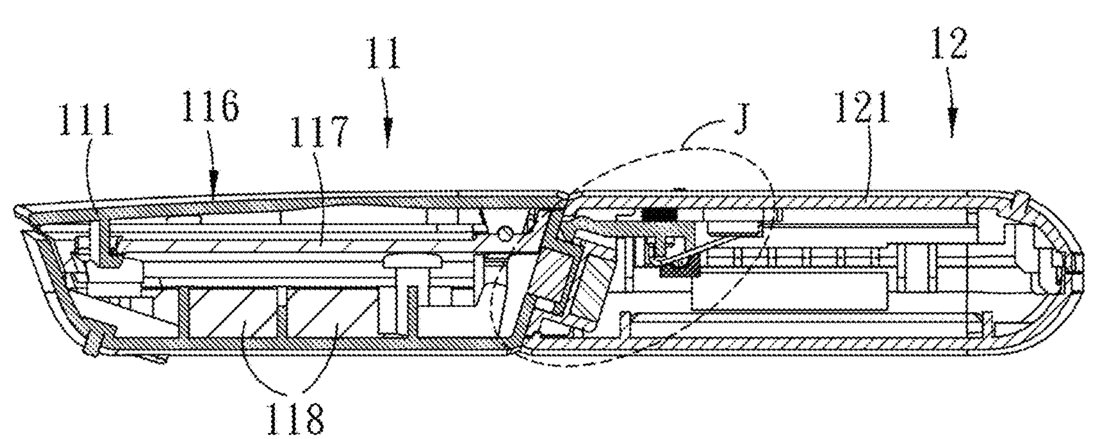
FIG. 26 is a sectional view along line I-I' of FIG. 20.

In another embodiment, referring to FIGS. 25 and 26, the first module 11 includes a control unit 116, a circuit board 117, and a power unit 118. The control unit 116 is disposed on the surface of the first body 111 opposite to the bottom surface 113. The circuit board 117 and the power unit 118 are both disposed inside the first body 111. The control unit 116 is electrically connected to the circuit board 117, and the circuit board 117 is electrically connected to the power unit 118. In this embodiment, all the electrical components are integrated within the first body 111. Therefore, there is no need for electrical interconnection between the first body 111 and the second body 121 via an external electrical structure. This configuration ensures that the power unit 118 can stably supply power to the circuit board 117 without requiring an additional plug-socket connection between the two modules.

In yet another embodiment, the first module 11 and/or the second module 12 includes a weight block (not shown). The weight block is disposed within the first body 111 and/or the second body 121. The purpose of the weight block is to enhance the operational feel of the mouse structure 1 during user handling. The weight can be increased or decreased according to the user's needs and can also be adjusted to the desired location within the structure, such as inside the first body 111 or the second body 121.

Figure 19:
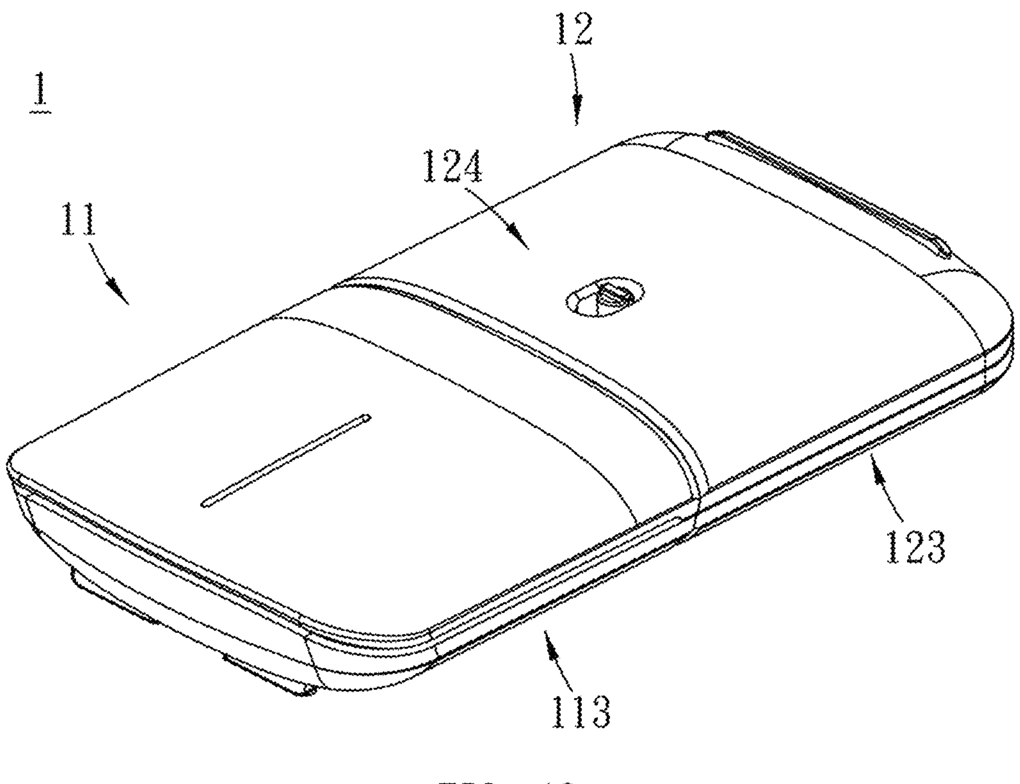
FIG. 19 is a perspective view of another embodiment of the mouse device in the stowed state.
Figure 20:
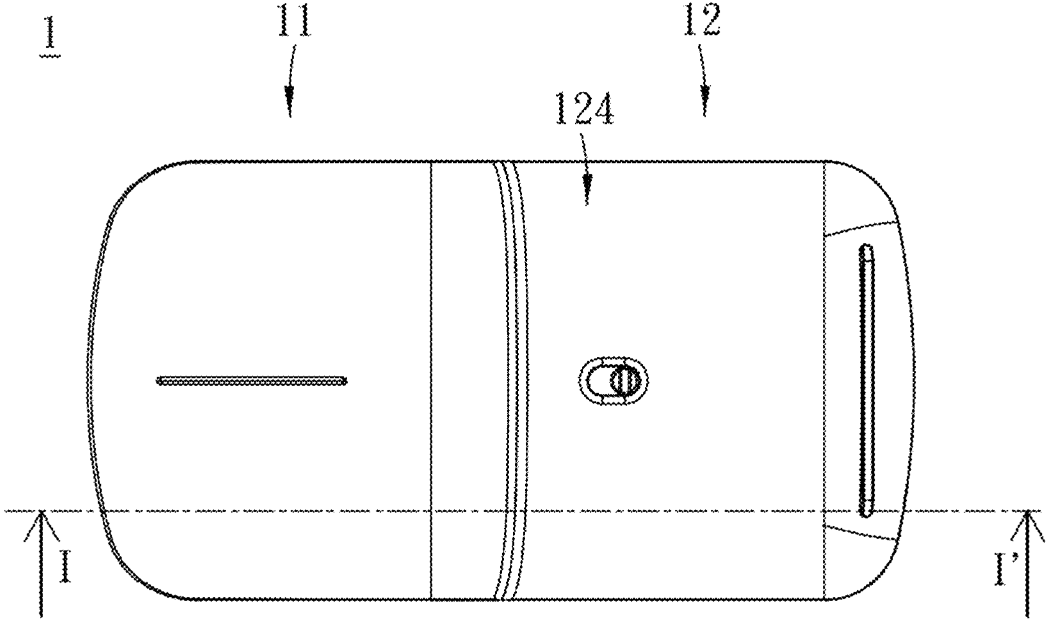
FIG. 20 is a top view of the mouse device in the stowed state according to the second embodiment.
Figure 21:
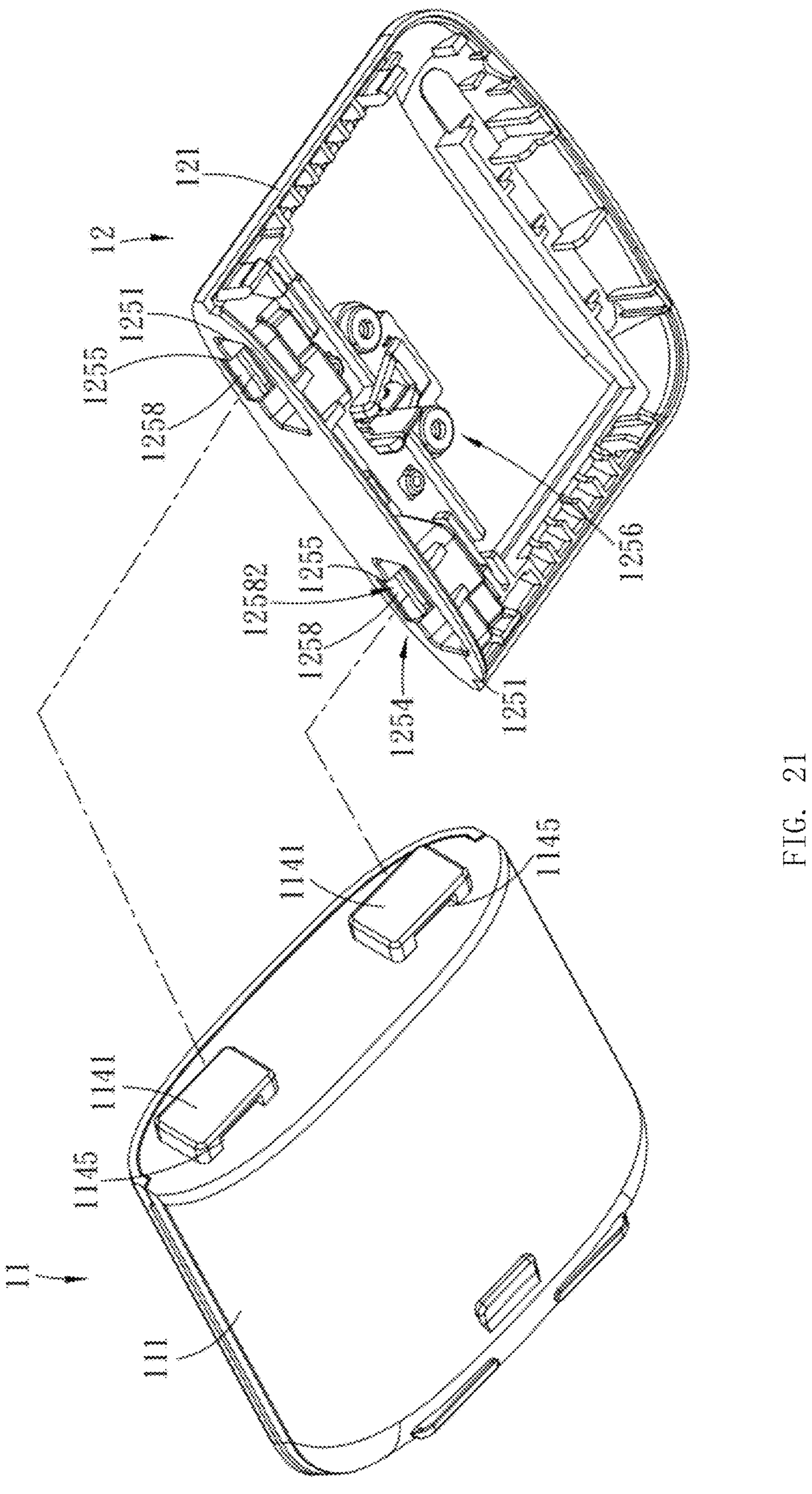
FIG. 21 is an exploded view of the structure in the stowed state.
Figure 22:
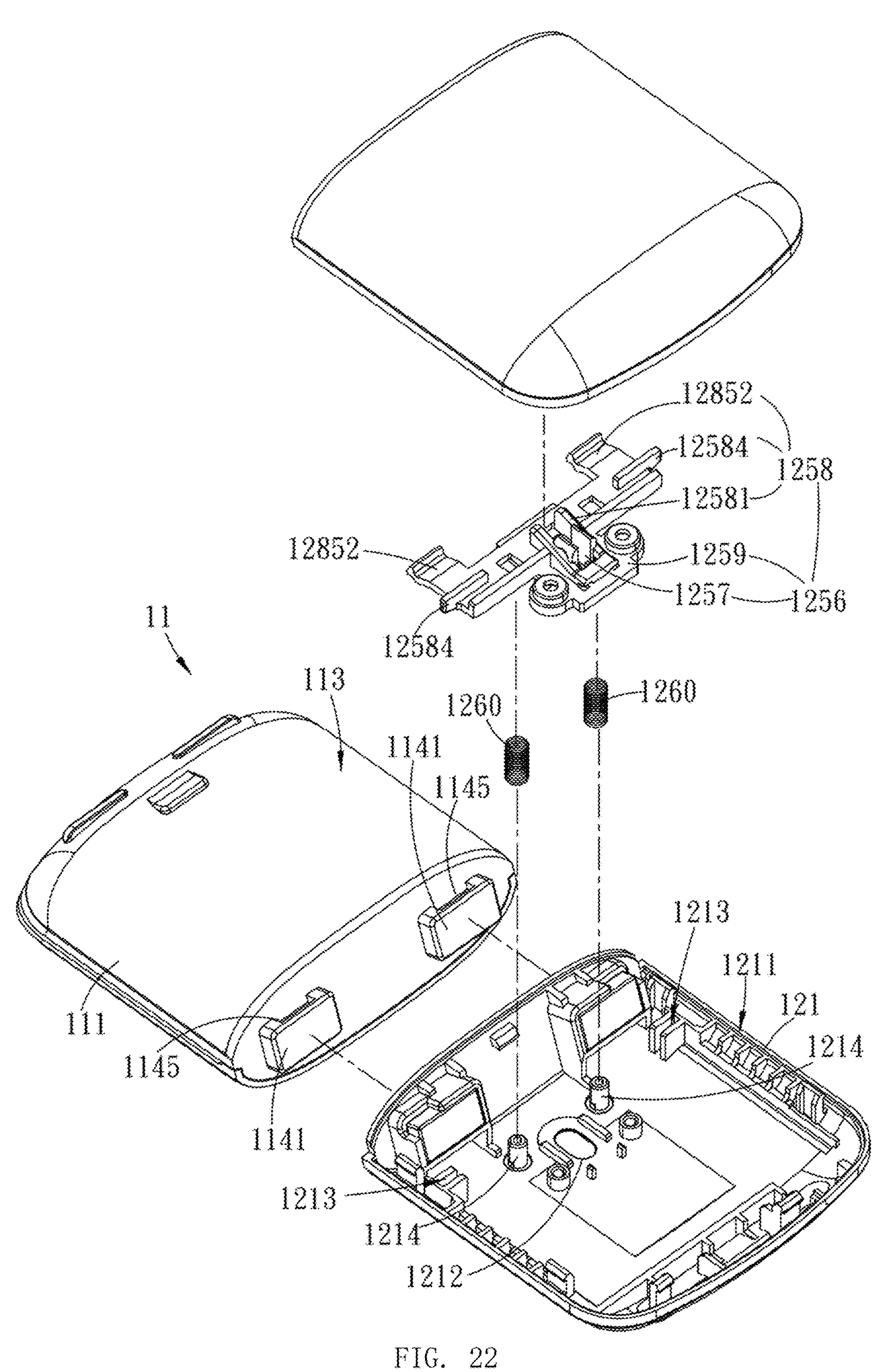
FIG. 22 is an exploded view of the internal structure of the mouse device.
Figure 23:
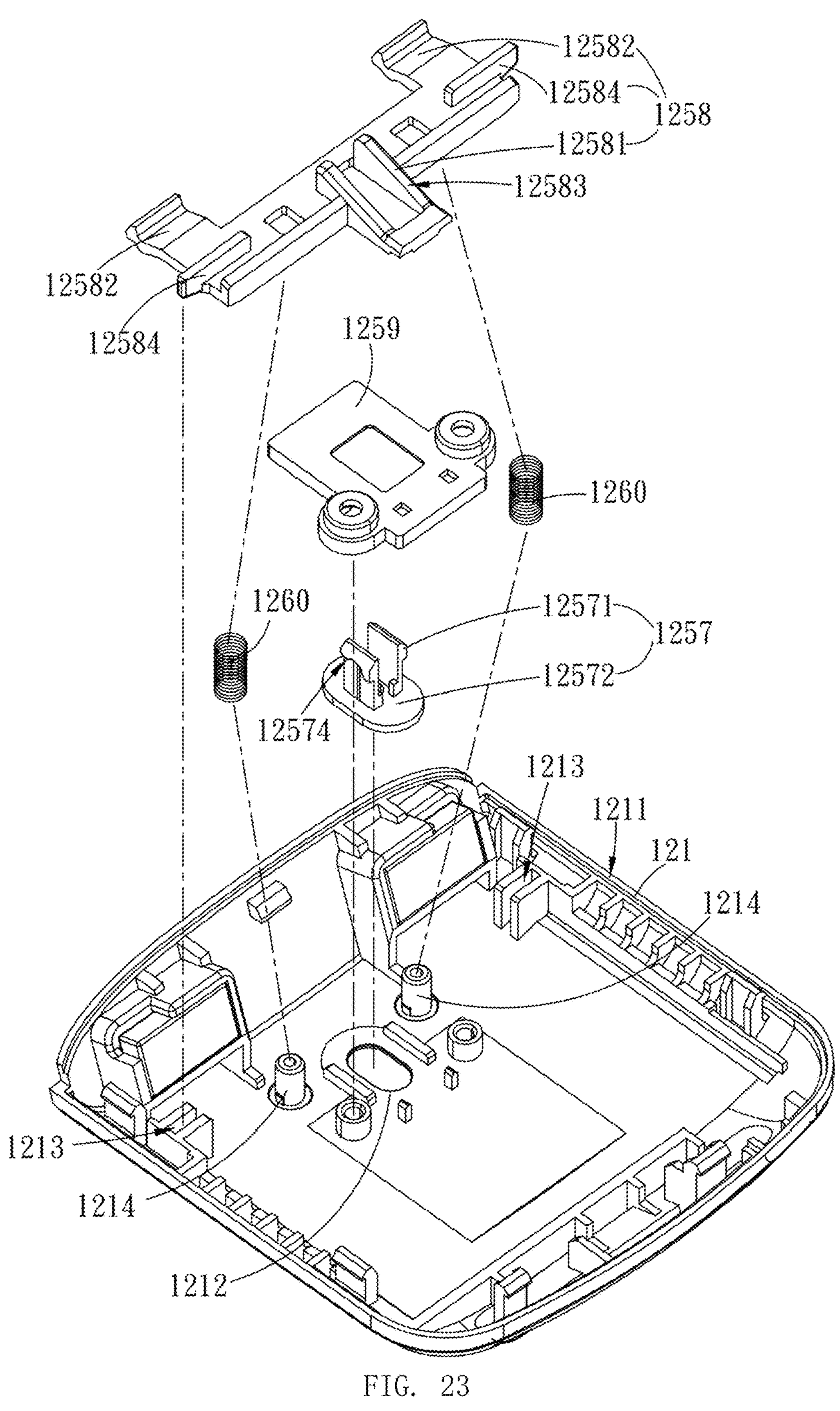
FIG. 23 is a partial exploded view of the assembly.
Figure 24:
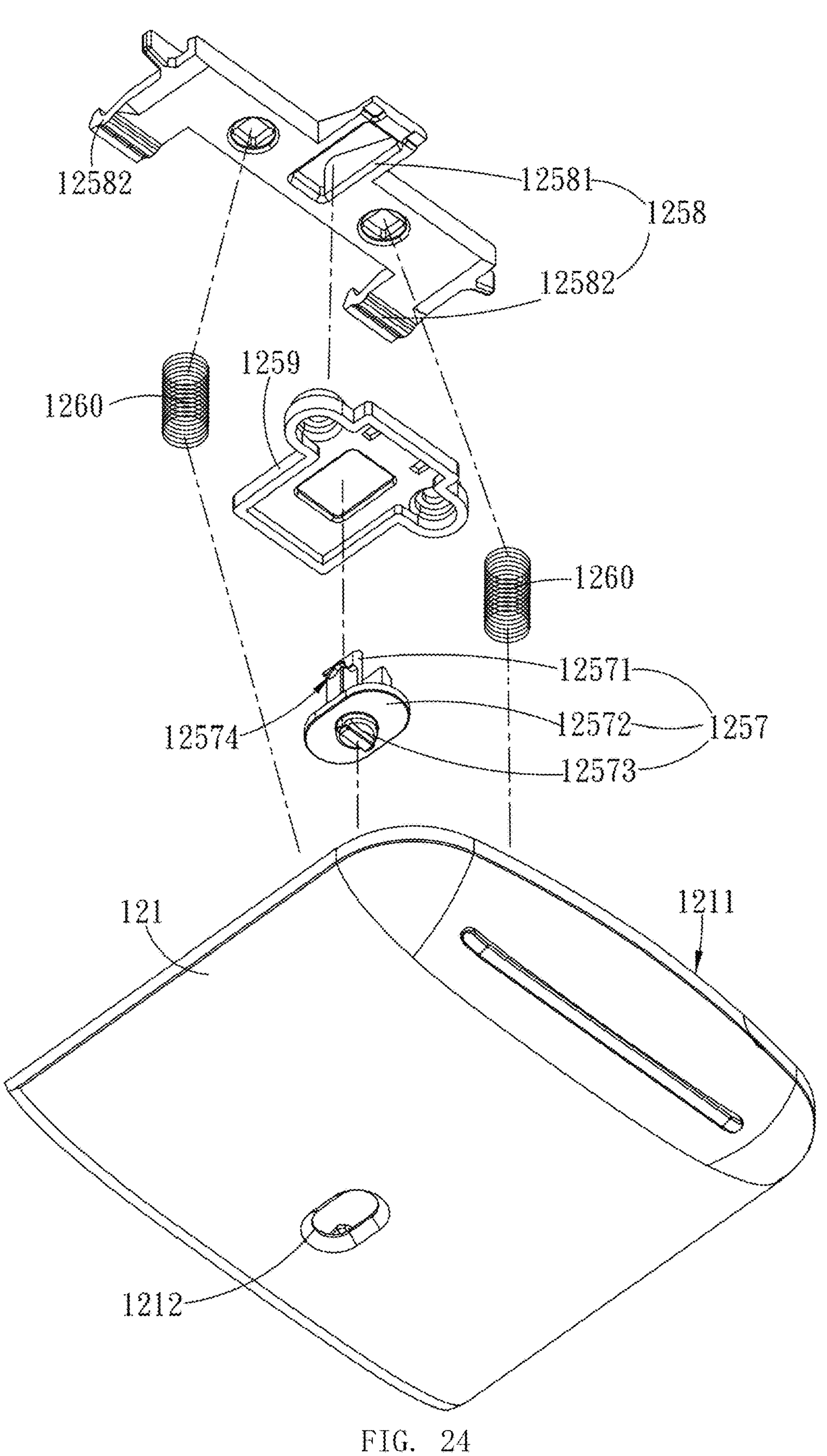
FIG. 24 is another partial exploded view of the assembly.
Figure 27:
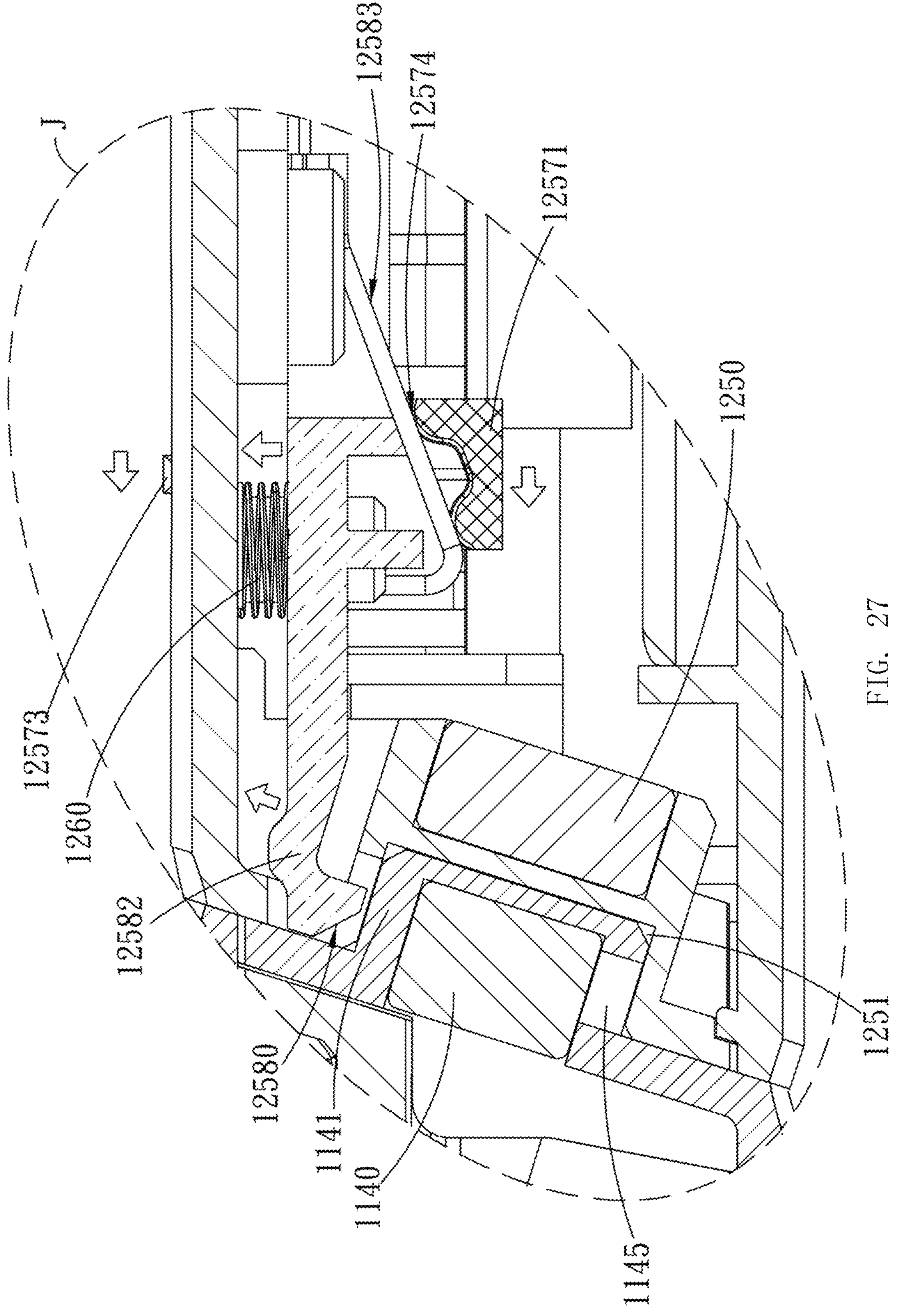
FIG. 27 is an enlarged view of region J in FIG. 26.

Referring to FIGS. 19 to 27. FIG. 19 is a perspective view of another embodiment of the mouse structure in the stowed state; FIG. 20 is a top view in the stowed state; FIG. 21 is an exploded view of the stowed configuration; FIG. 22 is an exploded view of the internal structure; FIGS. 23 and 24 are exploded views of partial structures; FIG. 25 is an exploded sectional view along line I-I' of FIG. 20; FIG. 26 is a sectional view along line I-I' of FIG. 20; and FIG. 27 is an enlarged view of region J in FIG. 26. As shown in the figures, the main difference in this embodiment from the previous one lies in the combination of the protrusion 1141 of the first assembly structure 114 and the groove 1251 of the second assembly structure 125. In this embodiment, a notch 1145 is formed on the sidewall of the protrusion 1141 near the bottom surface 113 of the mouse. The groove 1251, located near the second surface 124, includes a hook component 1254 on its inner wall. The second body 121 further includes an outer casing defined as a second housing 1211. The hook component 1254 includes an opening 1255 and a hook assembly 1256. The opening 1255 is positioned on the inner wall of the groove 1251 near the second surface 124. The hook assembly 1256 is disposed inside the second body 121. The second surface 124 of the second housing 1211 includes a through-hole 1212. The hook assembly 1256 further includes a linkage member 1257 and a hook piece 1258. The linkage member 1257 comprises a pressing portion 12571, a fixing portion 12572, and a control portion 12573. The pressing portion 12571 is disposed above the fixing portion 12572, while the control portion 12573 is disposed below the fixing portion 12572. The control portion 12573 of the linkage member 1257 is located inside the through-hole 1212 and is movable within it. The pressing portion 12571 is operatively connected to the hook piece 1258, one end of which is positioned in the opening 1255. In this embodiment, the fixing portion 12572 is implemented as a flat plate structure; the pressing portion 12571 is configured as a vertically extending column; the control portion 12573 serves as a user-operable element to drive the movement of the linkage mechanism.

As described above, the hook piece 1258 includes a body portion 12581 and a hook portion 12582. The hook portion 12582 extends outward from the body portion 12581 toward the opening 1255. The hook assembly 1256 also includes a fixing member 1259 and an elastic member 1260. The elastic member 1260 is disposed between the body portion 12581 and the second housing 1211. The second housing 1211 includes a fixing post 1214, and the elastic member 1260 is sleeved over the fixing post 1214. The fixing member 1259 is implemented as a frame structure and is disposed around the fixing portion 12572 of the linkage member 1257. That is, the fixing portion 12572 is positioned inside the frame of the fixing member 1259. The fixing member 1259 restricts the vertical movement of the fixing portion 12572 of the linkage member 1257, but does not restrict its horizontal displacement. In other words, it does not limit the movement of the control portion 12573 of the linkage member 1257 within the through-hole 1212. The pressing portion 12571 of the linkage member 1257 passes through both the fixing member 1259 and the body portion 12581 of the hook piece 1258, and abuts the body portion 12581. The pressing portion 12571 includes a first pressing edge 12574, while the body portion 12581 includes a second pressing edge 12583. The first pressing edge 12574 is configured to abut the second pressing edge 12583. Both the first and second pressing edges (12574 and 12583) are inclined surfaces. The first pressing edge 12574 is shaped in a wavy or undulating form, and it includes two low points that act as pressing contact points, arranged in parallel to the corresponding pressing edge 12583. This design reduces the actual contact area between the pressing edges 12574 and 12583, thereby reducing friction during actuation. As a result, the user can more easily operate the linkage member 1257 to drive the hook piece 1258.

When the linkage member 1257 is moved toward the side of the hook piece 1258 that includes the hook portion 12582, the pressing portion of the linkage member 1257 presses against the body portion 12581 of the hook piece 1258. This causes the body portion 12581 to compress the elastic member 1260. As a result, the body portion 12581 pulls the hook portion 12582 inward, causing it to retract into the opening 1255. Conversely, when the linkage member 1257 is moved away from the side of the hook piece 1258 having the hook portion 12582, the linkage member 1257 no longer applies pressure to the body portion 12581. In this case, the elastic member 1260 elastically supports the body portion 12581, allowing it to return to its original position. The body portion 12581 then drives the hook portion 12582 to extend outward from the opening 1255.

Furthermore, the hook piece 1258 is provided with a limiting portion 12584. Inside the second housing 1211, a limiting recess 1213 is formed. The limiting portion 12584 is located on both sides of the hook portion 12582. The hook piece 1258 is positioned on the fixing member 1259, and the limiting portions 12584 of the hook piece 1258 are snap-fitted into the limiting recesses 1213. This configuration restricts the horizontal movement of the hook piece 1258, thereby preventing it from shifting laterally. However, it does not restrict the vertical movement of the hook piece 1258—meaning the hook portion 12582 can still move in and out of the opening 1255 without obstruction.

Referring again to FIGS. 25 to 27, the first module 11 and the second module 12 are assembled and secured together. The protrusion 1141 of the first body 111 is inserted into the groove 1251 of the second body 121. The side of the protrusion 1141 that includes the first locking portion 1142 is inserted from the side opposite the second locking portion 1252 inside the groove 1251. In this configuration, the elastic member 1260 continues to elastically support the body portion 12581 of the hook piece 1258, so that the hook portion 12582 of the hook piece 1258 remains extended outward through the opening 1255.

Furthermore, once the protrusion 1141 of the first body 111 is fully inserted into the groove 1251 of the second body 121, the protrusion 1141 effectively closes off the opening 1255 of the groove 1251. The hook portion 12582 of the hook piece 1258 in the second body 121 is thereby constrained by the inserted protrusion 1141 of the first body 111. Although the hook piece 1258 remains within the opening 1255, one end of it continues to press against the side wall of the protrusion 1141. Thus, a friction-fit engagement is maintained between the first body 111 and the second body 121. In this assembled state, the bottom surface 113 of the first body 111 and the first surface 123 of the second body 121 together form a flat bottom surface, placing the mouse structure 1 in the stowed configuration.

Figure 28:
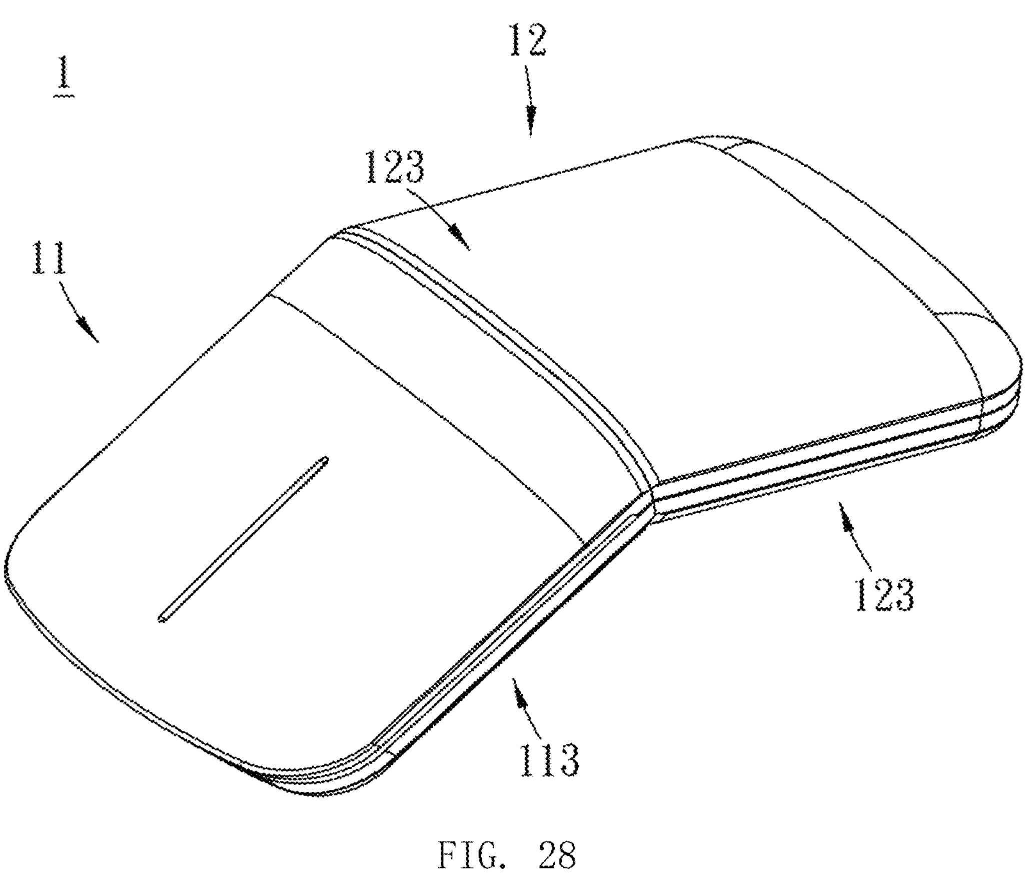
FIG. 28 is a perspective view of another embodiment of the mouse device in the usage state.
Figure 29:
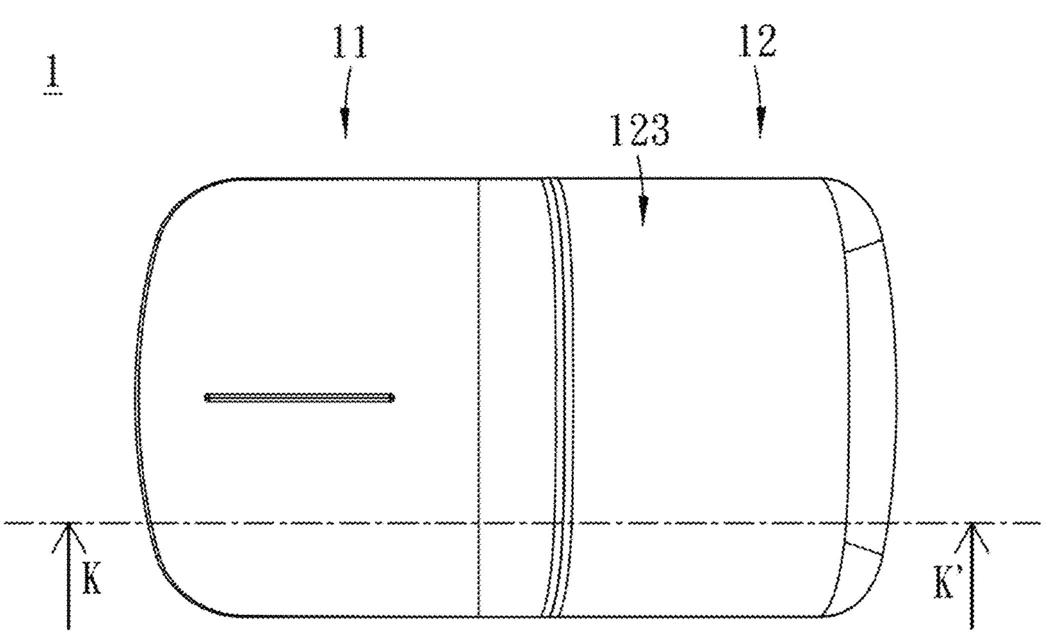
FIG. 29 is a top view of the mouse device in the usage state according to the second embodiment.
Figure 30:
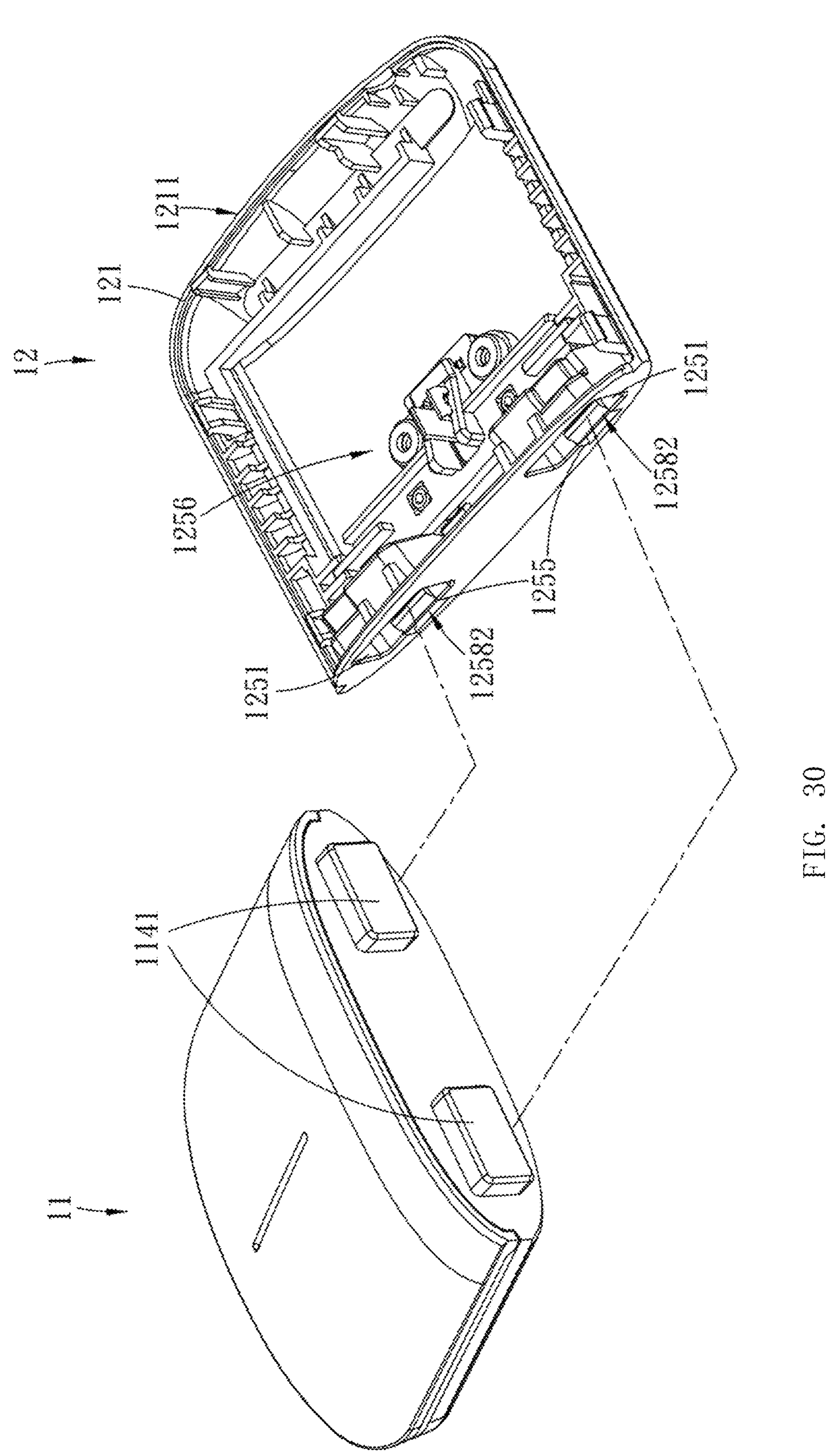
FIG. 30 is an exploded view of the mouse device in the usage state.
Figure 31:
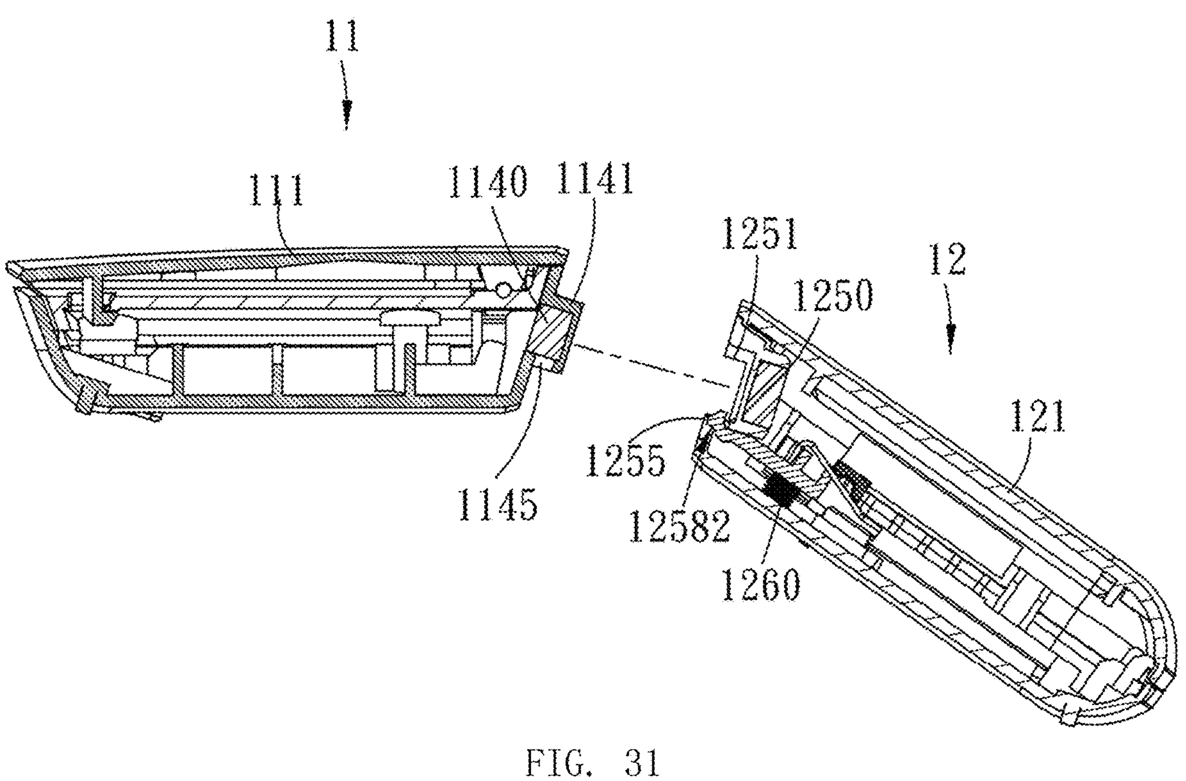
FIG. 31 is a sectional exploded view along line K-K' of FIG. 29.
Figure 32:
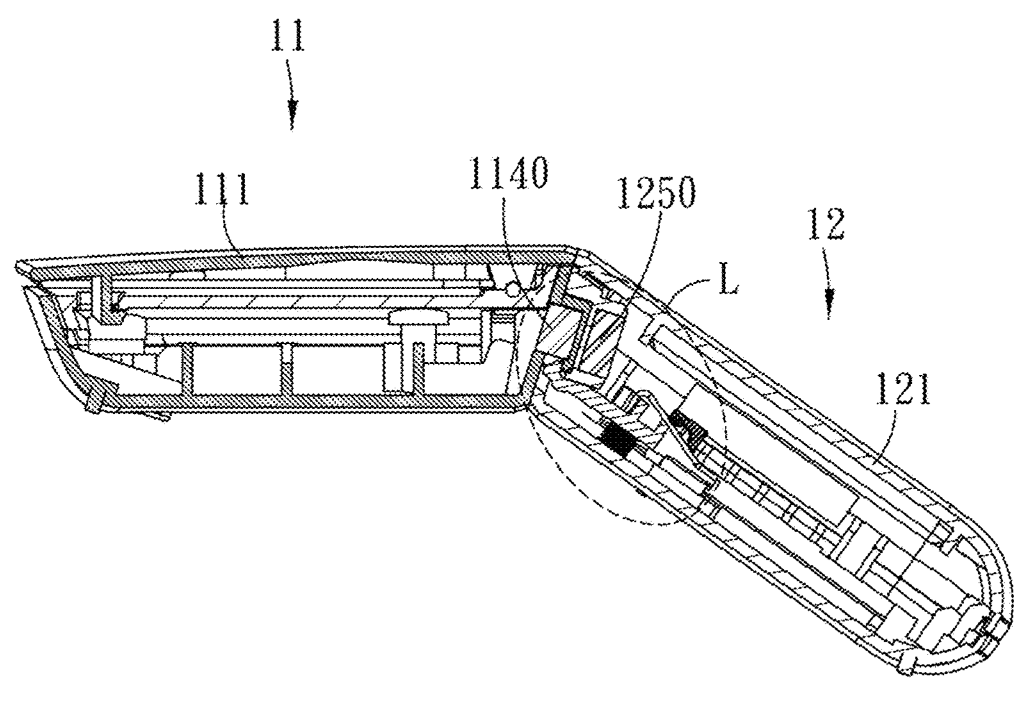
FIG. 32 is a sectional view along line K-K' of FIG. 29.
Figure 33:
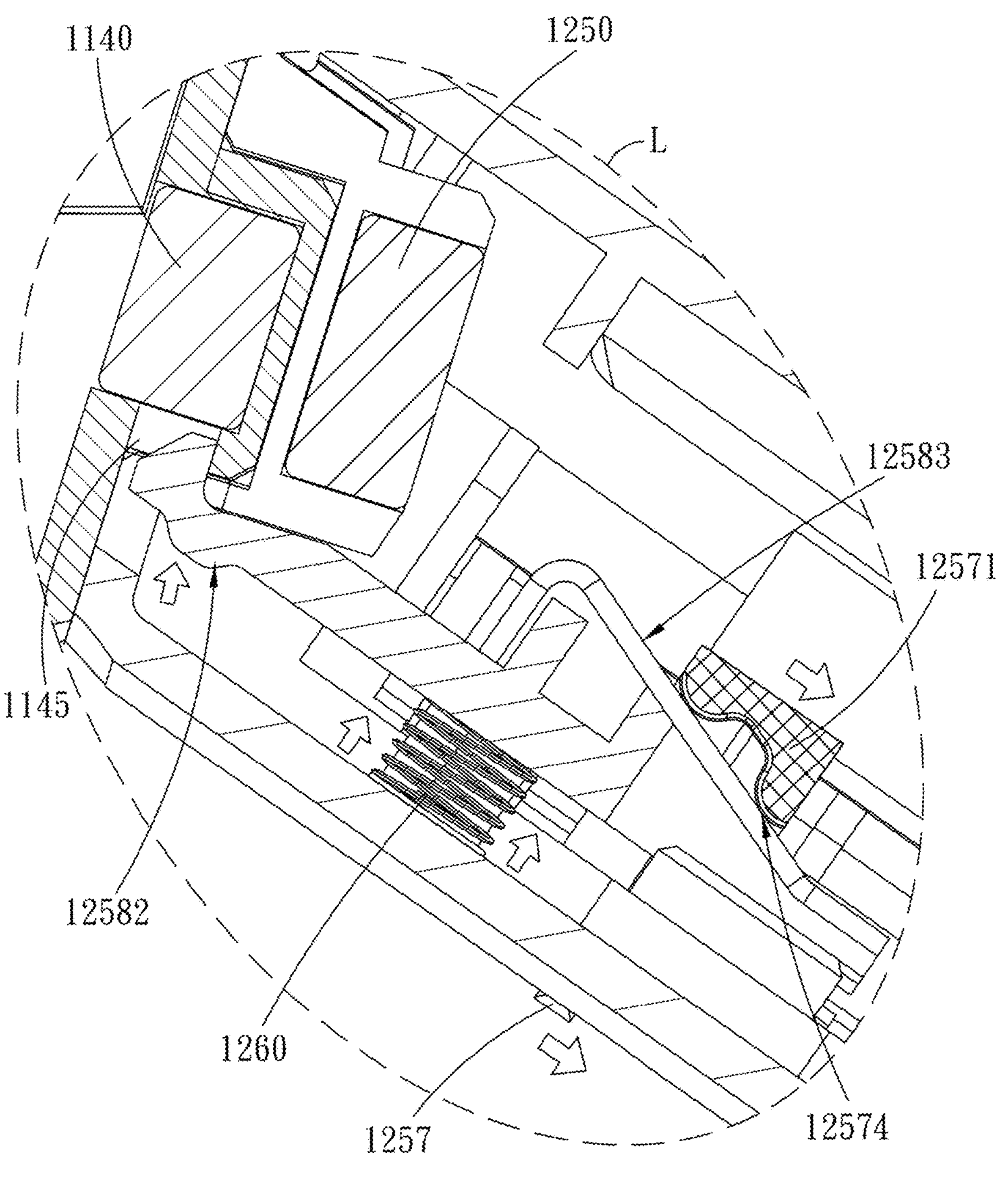
FIG. 33 is an enlarged view of region L in FIG. 32.

Referring also to FIGS. 28 to 33. FIG. 28 is a perspective view of another embodiment of the mouse structure in the usage state; FIG. 29 is a top view in the usage state; FIG. 30 is an exploded view in the usage state; FIG. 31 is an exploded sectional view along line K-K' of FIG. 29; FIG. 32 is a sectional view along line K-K' of FIG. 29; and FIG. 33 is an enlarged view of region L in FIG. 32. As shown in this embodiment, the protrusion 1141 of the first module 11 is disengaged from the groove 1251 of the second module 12. To pull out the first module 11, an external force greater than the frictional force between the protrusion 1141 and the hook portion 12582 of the hook piece 1258 must be applied. Once disengaged, the second module 12 is flipped, causing the first surface 123 and the second surface 124 to switch positions. As a result, the second surface 124 of the second body 121 is aligned with the bottom surface 113 of the first body 111, that is, both are located on the same side. Thus, the bottom surface 113 of the first body 111 and the second surface 124 of the second body 121 together form an angled bottom surface, placing the mouse structure 1 into the usage configuration.

As described above, the protrusion 1141 of the first module 11 is re-inserted into the groove 1251 of the second module 12. The side of the protrusion 1141 that includes the notch 1145 is aligned with the side of the groove 1251 that includes the hook component 1254 and inserted accordingly. The notch 1145 of the protrusion 1141 and the hook assembly 1256 of the hook component 1254 are configured to engage with one another. As a result, the bottom surface 113 of the first body 111 and the second surface 124 of the second body 121 together form an angled bottom surface, thereby placing the mouse structure 1 in the usage state.

In this embodiment, the elastic member 1260 continues to elastically support the body portion 12581 of the hook piece 1258, such that the hook portion 12582 remains extended outward from the opening 1255. At this point, the first pressing edge 12574 of the pressing portion 12571 of the linkage member 1257 is first brought into contact with the second pressing edge 12583 of the body portion 12581 of the hook piece 1258. The linkage member 1257 is then actuated via the through-hole 1212, moving it in the direction of the hook portion 12582. As a result, the first pressing edge 12574 of the pressing portion 12571 pushes downward against the second pressing edge 12583 of the body portion 12581. This downward movement causes the body portion 12581 to compress the elastic member 1260. Once the support from the elastic member 1260 is removed, the hook portion 12582 is retracted into the opening 1255.

As described above, after the protrusion 1141 of the first body 111 is inserted into the groove 1251 of the second body 121, no further actuation is applied to move the linkage member 1257 toward the hook piece 1258. As a result, the elastic restoring force of the elastic member 1260 pushes the body portion 12581 of the hook piece 1258 back upward. The hook portion 12582 of the hook piece 1258 then extends outward again from the opening 1255. At this moment, the hook portion 12582 of the hook piece 1258 engages with the notch 1145 of the protrusion 1141. This configuration results in the bottom surface 113 of the first body 111 and the second surface 124 of the second body 121 forming an angled bottom surface, i.e., the mouse device enters the usage state. The engagement of the hook portion 12582 with the notch 1145 enhances the connection strength between the first body 111 and the second body 121.

In addition, referring again to FIG. 27, the assembly process of this embodiment may also be carried out using the guiding surface 12580 of the hook portion 12582. The hook portion 12582 includes a guiding surface 12580 that is oriented in the direction in which the protrusion 1141 is inserted into the groove 1251. As the protrusion 1141 is inserted into the groove 1251, it presses against the guiding surface 12580 of the hook portion 12582. This interaction causes the hook portion 12582 to be pushed inward into the opening 1255 as the protrusion 1141 advances, allowing the first body 111 and the second body 121 to be assembled and secured without requiring any operation of the linkage member 1257 to retract the hook portion 12582.

Furthermore, to reassemble the first module 11 and the second module 12 into the stowed configuration, the same procedures described above can be followed. Specifically, the linkage member 1257 is actuated through the through-hole 1212 in the direction toward the hook piece 1258, causing the hook portion 12582 of the hook piece 1258 to retract into the opening 1255. At this time, the hook portion 12582 is disengaged from the notch 1145 of the protrusion 1141, allowing the first module 11 to be detached from the groove 1251 of the second module 12. The second module 12 is then flipped again, such that the second surface 124 and the first surface 123 switch positions. The first surface 123 of the second body 121 is aligned with the bottom surface 113 of the first body 111, that is, both are located on the same side. As a result, the bottom surface 113 and the first surface 123 together form a flat bottom surface, placing the mouse device into the stowed configuration.

Additionally, in this embodiment, the magnetic attraction between the first magnetic element and the second magnetic element may further enhance the structural connection strength of the mouse device (as shown in FIG. 33). The configuration and electrical connection method between the first electrical structure 115 and the second electrical structure 126, as well as the power supply architecture involving the control unit 116, the circuit board 117, and the power unit 127 or 118, are also applicable to this embodiment. Furthermore, the implementation of a weight block for improving the tactile feel of mouse operation may also be integrated into this configuration. All of the above structural elements and functional options may be selectively applied and adjusted based on the user's specific needs and preferences.

In summary, the present application provides a mouse structure that enables the user to freely switch between a usage state and a stowed state through the assembly of a first module and a second module. The inclined surface of the first module is configured to mate with the inclined surface of the second module, allowing the two modules to be joined and aligned precisely. When the first module and the second module are arranged in a flat configuration, the mouse enters the stowed state. When the two modules are arranged in a folded or angled configuration, the mouse enters the usage state. This design allows for more convenient storage and enhanced usability for the user.

The foregoing description illustrates and describes several preferred embodiments of the present application. However, it should be understood that the present application is not limited to the forms disclosed herein and should not be construed as excluding other implementations. Various combinations, modifications, and adaptations may be made by those skilled in the art in view of the above teachings, without departing from the spirit and scope of the present utility model invention. Any modifications and changes made by those skilled in the art that fall within the scope and essence of the present application shall be considered within the scope of protection defined by the appended claims.

The invention claimed is:

1. A mouse device, comprising:

a first module having a first body, the first body including a first inclined surface and a bottom surface, the first inclined surface defining a first angle relative to the bottom surface; and a second module having a second body, the second body including a first surface, a second surface and a second inclined surface disposed between the first surface and the second surface, the second inclined surface defining a second angle relative to the first surface and a third angle relative to the second surface, wherein the first angle is not equal to the second angle, and the first angle is equal to the third angle;

wherein the first inclined surface and the second inclined surface are configured to be selectively joined in a flipped orientation to provide multiple assembly states, including:

a stowed state, in which the first angle is adjacent to the second angle, such that the bottom surface of the first body and the first surface of the second body together define a flat bottom surface; and a usage state, in which the first angle is adjacent to the third angle, such that the bottom surface of the first body and the second surface of the second body together define an angled bottom surface.

2. The mouse device of claim 1, wherein the first inclined surface comprises a first assembly structure, and the second inclined surface comprises a second assembly structure, wherein the first assembly structure and the second assembly structure are configured to engage with each other.

3. The mouse device of claim 2, wherein the first assembly structure includes a protrusion and the second assembly structure includes a groove, and the protrusion is configured to engage with the groove.

4. The mouse device of claim 3, wherein a sidewall of the protrusion adjacent to the bottom surface comprises a first locking portion, and a wall of the groove adjacent to the second surface comprises a second locking portion, and when the first locking portion and the second locking portion are engaged, the bottom surface and the second surface define the angled bottom surface.

5. The mouse device of claim 4, wherein the first locking portion is a positioning protrusion, and the second locking portion is a recess, and the positioning protrusion is configured to snap into the recess.

6. The mouse device of claim 4, wherein a side of the protrusion adjacent to the first locking portion comprises a hollow portion, and the first locking portion is deformable relative to the hollow portion.

7. The mouse device of claim 2, wherein the first assembly structure comprises a first magnetic element and the second assembly structure comprises a second magnetic element, and the first magnetic element and the second magnetic element are magnetically attracted to each other.

8. The mouse device of claim 7, wherein the first magnetic element is a magnet and the second magnetic element is a magnet or a magnetic material, and the first and second magnetic elements are magnetically engaged with each other.

9. The mouse device of claim 3, wherein a sidewall of the protrusion adjacent to the bottom surface comprises a recess, and a wall of the groove adjacent to the second surface comprises a hook member, and the recess and the hook member are configured to engage, thereby the bottom surface and the second surface define the angled bottom surface.

10. The mouse device of claim 9, wherein an outer side of the second body is a second housing, and the hook member comprises an opening and a hook assembly, the opening is located at the groove wall adjacent to the second surface, the hook assembly is disposed inside the second body, the second surface of the second housing comprises a through-hole, and the hook assembly further comprises a linkage member and a hook piece, one end of the linkage member is located within the through-hole, and the other end of the linkage member is operatively connected to the hook piece, wherein one end of the hook piece is positioned in the opening.

11. The mouse device of claim 10, wherein the hook piece comprises a body portion and a hook portion, the hook portion extends outward from the body portion to the opening, and the hook assembly further comprises a fixing member and an elastic member, the elastic member is disposed between the body portion and the second housing, the fixing member is disposed around the linkage member, the other end of the linkage member passes through the fixing member and the body portion of the hook piece, and the other end of the linkage member abuts the body portion of the hook piece.

12. The mouse device of claim 11, wherein the other end of the linkage member comprises a pressing portion, the pressing portion has a first pressing edge, the body portion comprises a second pressing edge, and the first pressing edge abuts the second pressing edge, wherein when the linkage member moves toward the hook portion, the linkage member presses the body portion, the body portion compresses the elastic member, and the hook portion retracts into the opening; or when the linkage member moves away from the hook portion, the linkage member does not press the body portion, the elastic member elastically supports the body portion, and the hook portion protrudes from the opening.

13. The mouse device of claim 2, wherein the first inclined surface comprises a first electrical structure and the second inclined surface comprises a second electrical structure, and the first electrical structure is electrically connectable to the second electrical structure.

14. The mouse device of claim 13, wherein the first module comprises a control unit and a circuit board, the control unit is disposed on a surface of the first body opposite to the bottom surface, the circuit board is disposed within the first body, the control unit is electrically connected to the circuit board, the circuit board is electrically connected to the first electrical structure, the second module comprises a power unit disposed within the second body, and the power unit is electrically connected to the second electrical structure.

15. The mouse device of claim 13, wherein the bottom surface and the second surface define the angled bottom surface, and the first electrical structure comprises an electrical plug, the second electrical structure comprises an electrical socket, and the electrical plug is configured to be inserted into the electrical socket.

16. The mouse device of claim 13, wherein the bottom surface and the first surface define the flat bottom surface, and the first electrical structure comprises an electrical plug, the second electrical structure comprises a storage socket, and the electrical plug is configured to be stored within the storage socket.

17. The mouse device of claim 2, wherein the first module comprises a control unit, a circuit board, and a power unit, the control unit is disposed on a surface of the first body opposite to the bottom surface, the circuit board and the power unit are disposed within the first body, the control unit is electrically connected to the circuit board, and the circuit board is electrically connected to the power unit.

18. The mouse device of claim 17, wherein the control unit comprises a touchpad or a combination of buttons and a scroll wheel.

19. The mouse device of claim 1, wherein the first module and/or the second module comprises a weight block, the weight block is disposed within the first body and/or the second body.

20. The mouse device of claim 1, wherein the first angle is complementary to the second angle, the first angle is equal to the third angle, and the third angle is complementary to the second angle.

* * * * *